(12) United States Patent
Matsushima et al.

(10) Patent No.: US 8,253,869 B2
(45) Date of Patent: Aug. 28, 2012

(54) LIQUID CRYSTAL DISPLAY DEVICE WITH TOUCH PANEL AND TERMINAL DEVICE

(75) Inventors: Jin Matsushima, Kawasaki (JP); Ken Sumiyoshi, Kawasaki (JP); Shinichi Uehara, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 1028 days.

(21) Appl. No.: 12/051,872

(22) Filed: Mar. 20, 2008

(65) Prior Publication Data

US 2009/0002580 A1 Jan. 1, 2009

(30) Foreign Application Priority Data

Mar. 20, 2007 (JP) .................................. 2007-090552

(51) Int. Cl.
*G02F 1/1335* (2006.01)

(52) U.S. Cl. ...................... 349/12; 349/113; 349/114

(58) Field of Classification Search ........... 349/113–114
See application file for complete search history.

(56) References Cited

U.S. PATENT DOCUMENTS

| | | | |
|---|---|---|---|
| 2006/0028601 A1* | 2/2006 | Kawahara et al. | 349/117 |
| 2006/0146207 A1* | 7/2006 | Cho et al. | 349/12 |
| 2006/0209239 A1 | 9/2006 | Lin | |
| 2006/0285038 A1 | 12/2006 | Uchida et al. | |
| 2009/0147193 A1 | 6/2009 | Uchida et al. | |

FOREIGN PATENT DOCUMENTS

| | | |
|---|---|---|
| CN | 1374549 | 10/2002 |
| CN | 1675580 | 9/2005 |
| JP | 8-114794 | 5/1996 |
| JP | 10-048625 | 2/1998 |
| JP | 11-242226 | 9/1999 |
| JP | 2001-042121 | 2/2001 |
| JP | 2003-131233 | 5/2003 |
| JP | 2003-344837 | 12/2003 |
| JP | 2004-86328 | 3/2004 |
| JP | 2004-309922 | 11/2004 |
| JP | 2005-106967 | 4/2005 |
| JP | 2006-098682 | 4/2006 |
| JP | 2006-146088 | 6/2006 |
| JP | 2006-259694 | 9/2006 |
| JP | 2006-309192 | 11/2006 |

OTHER PUBLICATIONS

Official Action dated Jan. 27, 2012 issued by the Japanese Patent Office in counterpart Japanese Patent Application No. 2007-090552, with English translation of pertinent portion of Official Action encircled by a wavy line, 4 pages.

(Continued)

*Primary Examiner* — Phu Vu
(74) *Attorney, Agent, or Firm* — Young & Thompson

(57) ABSTRACT

A liquid crystal display device with a touch panel has a reflective display region and a transmissive display region, at least the transmissive display region including a liquid crystal layer energizable according to a lateral electric field mode. The liquid crystal display device includes a liquid crystal layer held between a pair of substrate disposed in confronting relation to each other, observer-side circular polarizer 9 disposed outwardly of one of the substrates, back-side circular polarizer 8 disposed outwardly of the other substrate, observer-side compensator 11 for reducing refractive index anisotropy of the liquid crystal layer in the reflective display region and the liquid crystal layer in the transmissive display region, and touch panel 13 disposed between observer-side circular polarizer 9 and observer-side compensator 11.

15 Claims, 25 Drawing Sheets

OTHER PUBLICATIONS 22.2: Optical Properties of Retardation Film, Y. Fujimura et al.; SID International Sumposium, Digest of Techinical Papers, vol. XXIII, 1992.

Chinese Patent Office issued a Chinese Office Action dated Oct. 23, 2009, Application No. 200810090029.8.
Chinese Patent Office issued a Chinese Office Action dated May 28, 2010, Application No. 200810090029.8.

* cited by examiner

LIQUID CRYSTAL DISPLAY DEVICE WITH TOUCH PANEL AND TERMINAL DEVICE

This application is based upon and claims the benefit of priority from Japanese patent application No. 2007-90552, filed on Mar. 30, 2007, the disclosure of which is incorporated herein in its entirety by reference.

BACKGROUND OF THE INVENTION

1. Field of the Invention

The present invention relates to a liquid crystal display device with a touch panel and a terminal device incorporating such a liquid crystal display device.

2. Description of the Related Art

Recently, liquid crystal display devices have widely been used in terminal devices including large terminal devices such as display monitors, television sets, etc., medium terminal devices such as notebook personal computers, ATMs (Automated Teller Machines), etc., and small terminal devices such as personal television sets, PDAs (Personal Digital Assistants), cellular phones, portable game machines, etc. In addition, liquid crystal display devices combined with a touch panel, which function not only as a display means but also a simply operable input means, are also widely used in medium and small terminal devices.

In particular, many small portable terminals such as PDAs incorporate a resistance-film touch panel which is low in cost and size. However, the resistance-film touch panel has been problematic in that it lowers the contrast ratio of the liquid crystal display device when used in outside light. A method for solving the problem is disclosed in JP-A No. 10-048625 (Patent Document 1).

FIG. 1 of the accompanying drawings is a schematic cross-sectional view showing a structure of a liquid crystal display device with a touch panel disclosed in Patent Document 1. As shown in FIG. 1, the liquid crystal display device with the touch panel comprises liquid crystal display device 107 and a resistance-film touch panel superposed on liquid crystal display device 107. The touch panel includes spacer 103, and two transparent substrates 101 disposed in confronting relation to each other across spacer 103. Transparent electrode 102 is disposed on one surface of each of transparent substrates 101. First quarter-wave plate 104 is interposed between liquid crystal display device 107 and the touch panel. A circular polarizer comprising polarizer 106 and second quarter-wave plate 105 is disposed on the touch panel.

The contrast ratio of a liquid crystal display device refers to a value produced as a quotient when the luminance of a fully white image is divided by the luminance of a fully black image. An air layer is present between a pair of confronting transparent electrodes of a resistance-film touch panel. Therefore, the interfaces between the transparent electrodes and the air layer produce relatively large surface reflections. Even while a fully black image is being displayed, outside light applied to the touch panel is reflected by the interfaces between the transparent electrodes and the air layer and returns to the observer. As a result, the luminance of the fully black image increases, and the contrast ratio decreases.

With the liquid crystal display device with the touch panel disclosed in Patent Document 1, before outside light is applied to the touch panel, it is converted into circularly polarized light by the circular polarizer disposed on the touch panel, and the circularly polarized light is reflected by the interface between transparent electrode 102 and the air layer. When the circularly polarized light is reflected by the interface, it is converted into circularly polarized light which is in a direction opposite to the direction of the applied circularly polarized light. Therefore, the reflected light is absorbed by the circular polarizer. As a consequence, the contrast ratio is prevented from being lowered by the outside light reflected by the interface between transparent electrode 102 and the air layer.

Light emitted from general liquid crystal display devices is linearly polarized light, and light emitted from liquid crystal display device 107 disclosed in Patent Document 1 is also linearly polarized light. The liquid crystal display device with the touch panel disclosed in Patent Document 1 includes first quarter-wave plate 104 for converting the light (linearly polarized light) emitted from liquid crystal display device 107 into circularly polarized light. Therefore, the light emitted from liquid crystal display device 107 is not absorbed by the circular polarizer, but passes efficiently through the circular polarizer.

For further suppressing the reduction of the contrast ratio due to the reflection by the touch panel, the circular polarizer should preferably function as a circular polarizer for visible light in various wavelength bands, i.e., a wide-band circular polarizer. Generally, two methods, described below, may be used to provide a wide-band circular polarizer.

According to one of the methods, a circular polarizer comprises a single polarizer and two or more phase retarders. Specifically, a circular polarizer comprises a polarizer, a half-wave plate, and a quarter-wave plate. In the pre-sent description, the method wherein a circular polarizer comprises a single polarizer and two or more phase retarders is referred to as "double phase retarder design".

According to the other method, a circular polarizer comprises a single polarizer and a phase retarder whose retardation value is represented by a quarter-wavelength in a wide visible range (hereinafter referred to as "reverse dispersion quarter-wave plate"). In the present description, this method is referred to as "single phase retarder design".

Liquid crystal display devices are generally classified into transmissive, reflective, and semitransmissive types. The semitransmissive liquid crystal display device employs transmitted light and reflected light. The reflective liquid crystal display device employs is of a smaller power consumption requirement as it uses outside light for display, but has poorer display performances such as the contrast ratio, etc. than the semitransmissive liquid crystal display device. At present, therefore, the transmissive and semitransmissive liquid crystal display devices are mainly used in the art. The transmissive and semitransmissive liquid crystal display devices include a light source disposed behind the liquid crystal display panel and display an image using light emitted from the light source. Particularly, medium and small liquid crystal display devices that are carried by the users and used in various situations widely comprise semitransmissive liquid crystal display devices which use a reflective display mode in bright environments and a transmissive display mode in dark environments.

Heretofore, liquid crystal display panels for use in the semitransmissive liquid crystal display devices have employed an ECB (Electrically Controlled Birefringence) mode and a multidomain vertical alignment mode for higher image quality and wide field-of-view angle. Attempts for applying a lateral electric field mode which has a wider field-of-view angle in principle to a semitransmissive liquid crystal display device is disclosed in JP-A No. 2005-106967 (Patent Document 2).

FIG. 2 of the accompanying drawings is a schematic exploded perspective view showing a structure of the semitransmissive liquid crystal display device disclosed in Patent Document 2. In FIG. 2, an XYZ orthogonal coordinate system is defined as follows: The direction from liquid crystal layer 206a toward polarizer 202 is defined as a +Z-axis direction, and the opposite direction as a −Z-axis direction. Directions extending parallel to the sheet of FIG. 2 and perpendicularly to the Z-axis are defined as X-axis directions. The rightward direction on the sheet is defined as a +X-axis direction, and the leftward direction as a −X-axis direction. A +Y-axis direction is a direction in a right-handed coordinate system. Specifically, when the thumb of the right hand is oriented in the +X-axis direction and the index finger in the +Y-axis direction, the middle finger points to the +Z-axis direction.

The semitransmissive liquid crystal display device shown in FIG. 2 comprises a polarizer, a phase retarder, a liquid crystal layer, and a reflector. In the present description, the placement angle of the phase retarder is expressed as the angle formed between the retardation axis (the retarder axis) and the X-axis. The counterclockwise direction as viewed from the +Z-axis direction is defined as positive. The placement angle of the polarizer is expressed as the angle formed between the absorption axis of the polarizer and the X-axis. The placement angle of the liquid crystal layer that is horizontally oriented is expressed as the angle formed between the orientation axis of the liquid crystal layer and the X-axis when no voltage is applied to the liquid crystal layer.

An Nz coefficient and the angle dependency of a retardation used in the present description will be described below. The Nz coefficient is expressed as:

$$Nz=(nx-nz)/(nx-ny) \quad (1)$$

where nx represents the refractive index of a birefringence medium (phase retarder or the like) in a direction (retarder axis) to maximize the refractive index within the film plane thereof, ny the refractive index in an in-plane direction perpendicular to the retarder axis, and the nz the refractive index in a thicknesswise direction.

As indicated by the equation (2) shown below, a retardation Re(0) with respect to light parallel to the normal line of the retarder is determined by the difference between the refractive indexes nx, ny in the in-plane main axis directions and the thickness d of the phase retarder.

$$Re(0)=(nx-ny)\times d \quad (2)$$

A retardation with respect to light inclined to the normal line of the retarder is affected by the refractive index nz in the thicknesswise main axis direction and the optical path length that has increased because the optical axis is inclined to the normal line. In the present description, the retardation with respect to light parallel to the normal line of the retarder will be referred to as "retardation" or "Re(0)" and the retardation with respect to light inclined to the normal line of the retarder will be referred to as "oblique retardation" or "Re(θ)". In particular, the retardation with respect to applied light whose optical axis is inclined to the retarder axis will be referred to as "Rex(θ)", the retardation with respect to applied light whose optical axis is inclined in the in-plane direction perpendicular to the retarder axis will be referred to as "Rey(θ)".

For phase retarders for use in liquid crystal display devices, it is known in the art that Re(0), Rex(θ), and Rey(θ) are related to each other depending on the Nz coefficient, as follows: For a phase retarder with Nz=1, the relationship nz=ny is satisfied according to the equation (1). Therefore, when the index ellipsoid is observed from the direction of normal line of the substrate, it is shaped like a rugby ball whose length is greatest in the direction of the retarder axis. At this time, the relationship Re(0)>Rex(θ), Re(0)<Rey(θ) is satisfied.

For a phase retarder with Nz=0, the relationship nz=nx is satisfied according to the equation (1). Therefore, the index ellipsoid is of a shape whose length is greatest in the direction of the retarder axis and the thicknesswise direction. At this time, the relationship Re(0)<Rex(θ), Re(0)>Rey(θ) is satisfied.

It is known that when the phase retarder with Nz=1 and the phase retarder with Nz=0, whose Re(0) are equal to each other, are disposed such that their retarder axes are perpendicular to each other, the phase retarder with Nz=1 cancels out the refractive index anisotropy of the phase retarder with Nz=0.

For a phase retarder with Nz=0.5, the relationship nz=(nx+ny)/2 is satisfied. Therefore, the index ellipsoid is of a shape which is intermediate between the shape of the phase retarder with Nz=1 and the shape of the phase retarder with Nz=0. It is known that Re(0)≈Re(θ) in a wide range of θ (see SID1992, DIGEST, pages 397-400).

Referring back to FIG. 2, the liquid crystal layer is divided into liquid crystal layer 206a corresponding to a transmissive display region and liquid crystal layer 206b corresponding to a reflective display region. If the transmissive display region of the liquid crystal display device is viewed from the display screen, then it comprises polarizer 202, half-wave plate 205 (Nz=1), liquid crystal layer 206a, phase retarder 204 (Nz=0), half-wave plate 203 (Nz=0), and polarizer 201 which are stacked together in the order named. If the reflective display region of the liquid crystal display device is viewed from the display screen, then it comprises polarizer 202, half-wave plate 205 (Nz=1), liquid crystal layer 206a, and reflector 207 which are stacked together in the order named.

The liquid crystal layer is horizontally oriented. Liquid crystal layer 206b has a retardation represented by a quarter wavelength. Liquid crystal layer 206a has a retardation which is slightly smaller than twice the retardation of the reflective display region. Specifically, the retardation of liquid crystal layer 206a is in the range from 1.7 to 1.9 times the retardation of the reflective display region. If one wavelength is 550 nm, then the retardation of liquid crystal layer 206a of the transmissive display region is in the range from 233.8 nm to 261.2 nm.

The placement angle of polarizer 202 is 90 degrees. The placement angle of half-wave plate 205 is 15 degrees. The placement angle of the liquid crystal layer is 75 degrees. The placement angle of phase retarder 204 is 165 degrees. The placement angle of half-wave plate 203 is 105 degrees. The placement angle of polarizer 201 is 0 degree. Polarizer 202, half-wave plate 205, and liquid crystal layer 206b of the reflective display region jointly make up a wide-band circular polarizer.

The above optical configuration of the liquid crystal display device shown in FIG. 2 makes it possible to equalize voltage-controlled operation of liquid crystal layer 206a of the transmissive display region and liquid crystal layer 206b of the reflective display region. Specifically, when no voltage is applied to the liquid crystal layer, both the transmissive display region and the reflective display region are dark.

However, if the liquid crystal display device with the touch panel disclosed in Patent Document 1 and the lateral-field semitransmissive liquid crystal display device disclosed in Patent Document 2 are combined with each other, then the types and numbers of the phase retarders and wave plates are increased, resulting in an increase in the cost. The thickness of the liquid crystal display device is also increased. Furthermore since the types of paired phase retarders are different from each other, the contrast ratio of the transmissive display may possibly be reduced. These shortcomings will be described below.

As shown in FIG. 2, the lateral-field semitransmissive liquid crystal display device disclosed in Patent Document 2 requires two polarizers and three phase retarders of different types (half-wave plate 205 (Nz=1), phase retarder 204 (Nz=0), and half-wave plate 203 (Nz=0)).

Therefore, if the circular polarizer of the liquid crystal display device with the touch panel shown in FIG. 1 comprises a circular polarizer of the single phase retarder design and liquid crystal display device 107 comprises the semitransmissive liquid crystal display device disclosed in Patent Document 2, then the resultant liquid crystal display device requires three polarizers and five phase retarders of four types. Specifically, it requires three polarizers including polarizer 106 shown in FIG. 1 and polarizers 202, 201 shown in FIG. 2, and five phase retarders including quarter-wave plates 104, 105 shown in FIG. 1, half-wave plate 205 (Nz=1), phase retarder 204 (Nz=0), and half-wave plate 203 (Nz=0) shown in FIG. 2.

If the circular polarizer of the liquid crystal display device with the touch panel shown in FIG. 1 comprises a circular polarizer of the double phase retarder design, then the number of required phase retarders further increases. Specifically, the resultant liquid crystal display device requires three polarizers and seven phase retarders of four types.

In order to prevent the contrast ratio of the transmissive display from being lowered, half-wave plate 203 (Nz=0) and half-wave plate 205 (Nz=1) shown in FIG. 2 need to cancel out their respective retardations. Usually, the phase retarder with Nz=0 and the phase retarder with Nz=1 are made of different materials. For example, polystyrene is known as the material of the phase retarder with Nz=0, and polycarbonate is known as the material of the phase retarder with Nz=1. Therefore, the refractive indexes of half-wave plate 203 and half-wave plate 205 have different wavelength dispersions, and their retardations do not sufficiently cancel out each other. If half-wave plate 203 and half-wave plate 205 have their Re(0) canceled out insufficiently, then the contrast ratio of the transmissive display is lowered.

As described above, a number of optical films have been required to equalize the operation of the reflective and transmissive display regions of the semitransmissive liquid crystal display device while suppressing the reduction of the contrast ratio due to the reflection by the touch panel.

SUMMARY OF THE INVENTION

It is an object of the present invention to provide a semitransmissive liquid crystal display device with a touch panel which is capable of equalizing the operation of reflective and transmissive display regions thereof while suppressing the reduction of the contrast ratio due to the reflection by the touch panel.

One liquid crystal display device with a touch panel of the present invention, which has a reflective display region for being irradiated with outside light and a transmissive display region for being irradiated with light emitted from a light source, at least said transmissive display region including a liquid crystal layer energizable according to a lateral electric field mode, comprising:

a back-side substrate and an observer-side substrate which are disposed in confronting relation to each other;

a liquid crystal layer held between said back-side substrate and said observer-side substrate;

an observer-side circular polarizer disposed outwardly of said observer-side substrate;

a back-side circular polarizer disposed outwardly of said back-side substrate;

an observer-side compensator disposed between said observer-side circular polarizer and said back-side circular polarizer, for reducing refractive index anisotropy of said liquid crystal layer in said reflective display region and said liquid crystal layer in said transmissive display region; and a touch panel disposed between said observer-side circular polarizer and said observer-side compensator.

The above and other objects, features and advantage of the present invention will become apparent from the following description with reference to the accompanying drawings which illustrate examples of the present invention.

DESCRIPTION OF THE PREFERRED EMBODIMENTS

Exemplary Embodiment 1

A liquid crystal display device with a touch panel according to an Exemplary Embodiment of the present invention will be described below. The liquid crystal display device with the touch panel is energized according to an IPS (In-Place-Switching) mode.

Figure 1:
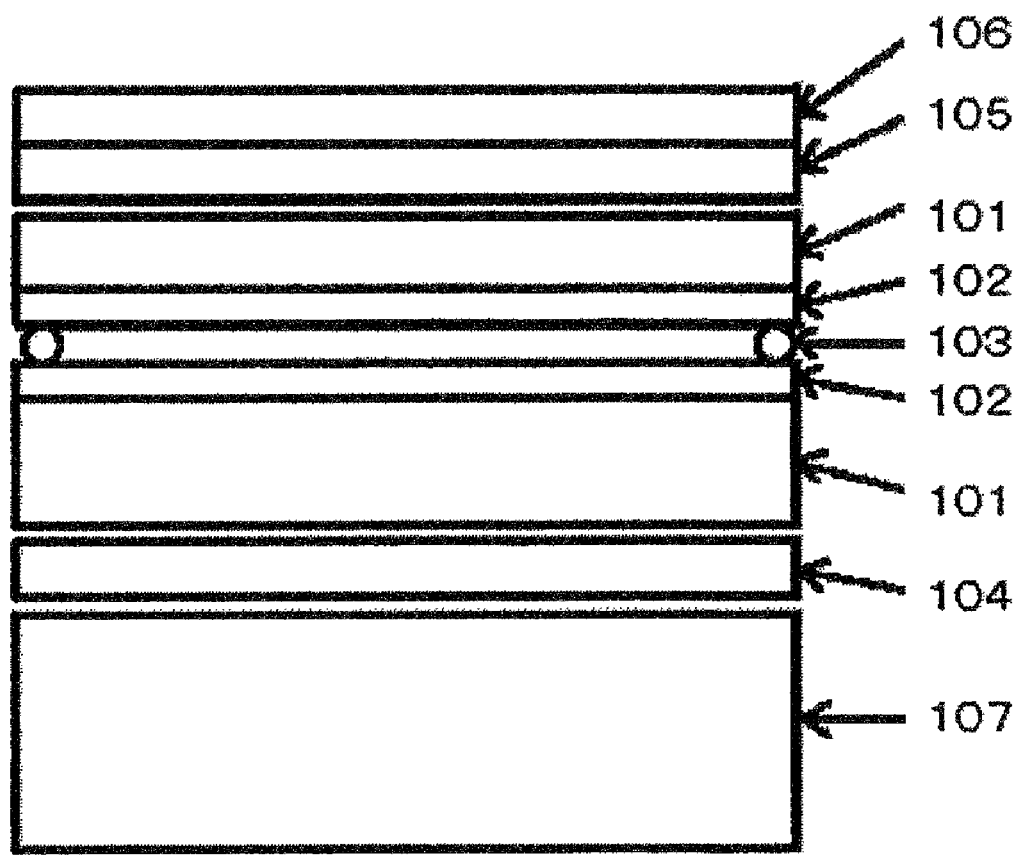
FIG. 1 is a schematic cross-sectional view showing a structure of a liquid crystal display device with a touch panel disclosed in Patent Document 1.
Figure 2:
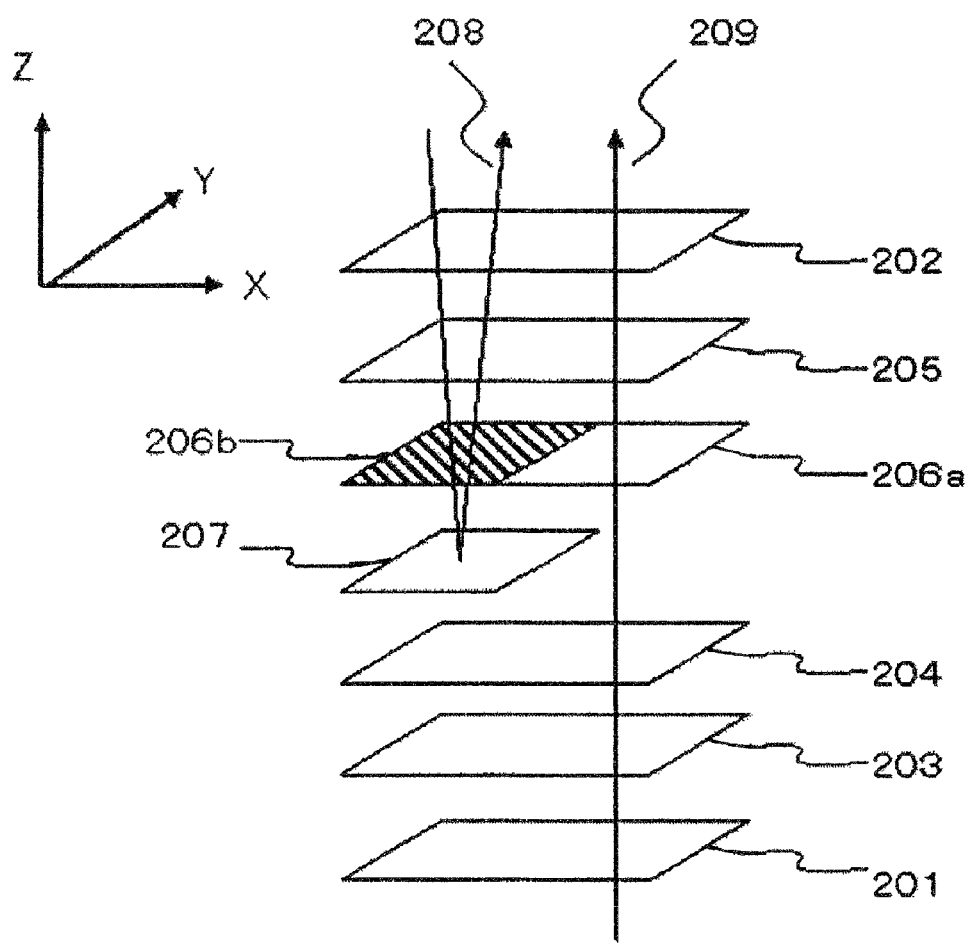
FIG. 2 is a schematic exploded perspective view showing a structure of a semitransmissive liquid crystal display device disclosed in Patent Document 2.
Figure 3:
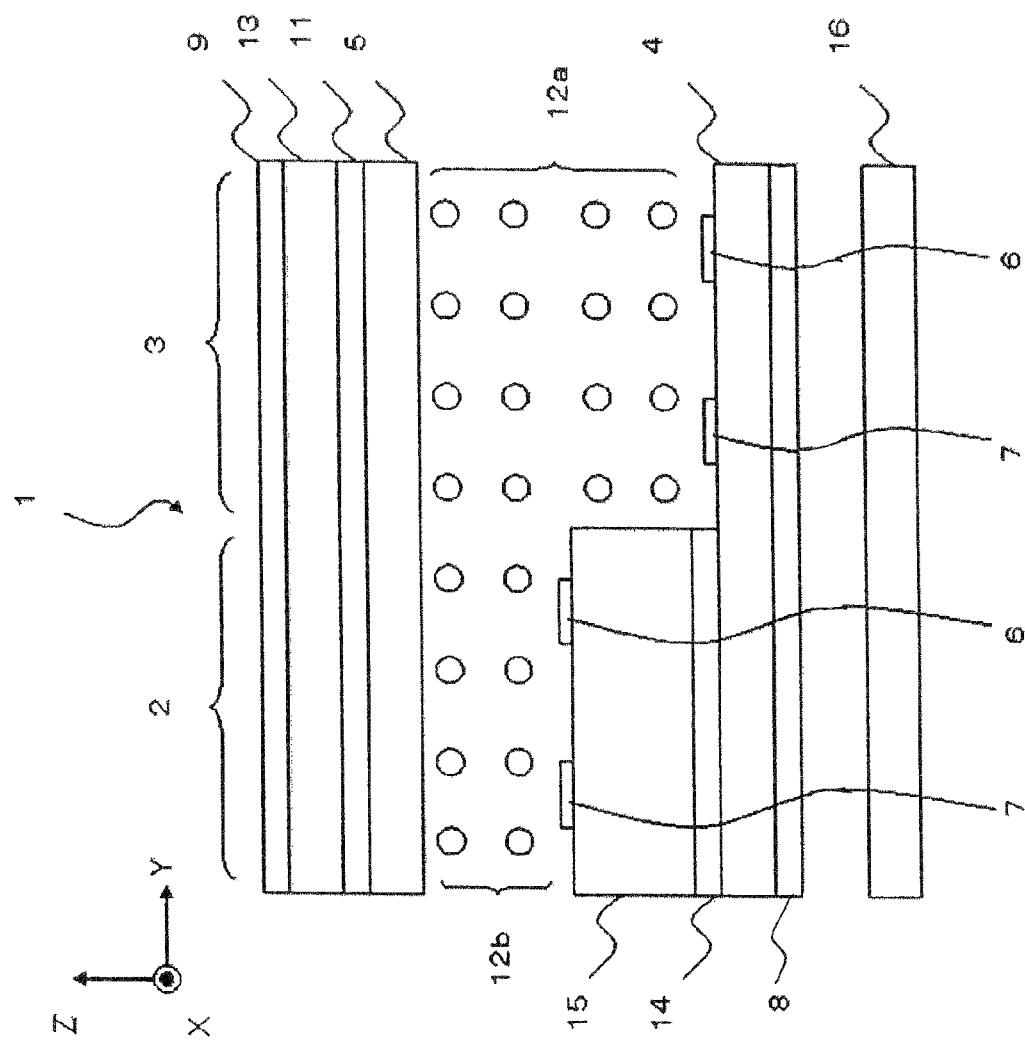
FIG. 3 is a cross-sectional view showing a structure of a liquid crystal display device with a touch panel according to Exemplary Embodiment 1.

As shown in FIG. 3, liquid crystal display device 1 according to the present Exemplary Embodiment has observer-side substrate 5 and back-side substrate 4 which are disposed in confronting relation to each other across a small gap. Liquid crystal layers 12a, 12b are held in the gap between observer-side substrate 5 and back-side substrate 4. Two types of electrodes, i.e., pixel electrodes 6 and common electrodes 7, are disposed on a surface of back-side substrate 4 which faces liquid crystal layers 12a, 12b. These two types of electrodes are shaped as comb teeth. Pixel electrodes 6 and common electrodes 7 are alternately disposed along directions perpendicular to the longitudinal direction of the comb teeth. Electrodes 6, 7 are made of a transparent electric conductor such as ITO (Indium Tin Oxide) or the like. Reflector 14 and insulating layer 15 are disposed in a portion of the region where pixel electrodes 6 and common electrodes 7 are disposed. Reflector 14 and insulating layer 15 are interposed between electrodes 6, 7 and back-side substrate 4. When liquid crystal display device 1 is viewed from the display screen, reflector 14 overlaps reflective display region 2, and the other region serves as transmissive display region 3. Reflective display region 2 and transmissive display region 3 are provided in each pixel. A number of pixels arranged in a matrix make up liquid crystal display device 1. The thickness of liquid crystal layer 12b in reflective display region 2 is smaller than the thickness of liquid crystal layer 12a in transmissive display region 3 because insulating layer 15 is present in reflective display region 2. The surface of observer-side substrate 5 remote from liquid crystal layers 12a, 12b supports observer-side compensator 11 thereon. Touch panel 13 is disposed on observer-side compensator 11, and observer-side circular polarizer 9 is disposed on touch panel 13. The surface of back-side substrate 4 remote from liquid crystal layers 12a, 12b supports back-side circular polarizer 8 thereon. A back light 16 serving as a light source for illuminating transmissive display region 3 is disposed below back-side circular polarizer 8.

In the present description, an XYZ orthogonal coordinate system is defined as follows: The direction from liquid crystal layers 12a, 12b toward observer-side circuit polarizer 9 is defined as a +Z-axis direction, and the opposite direction as a −Z-axis direction. The +Z-axis direction and the −Z-axis direction are collectively referred to as Z-axis directions. Lateral directions are defined as Y-axis directions. Particularly, the rightward direction on the sheet is defined as a +Y-axis direction, and the leftward direction as a −Y-axis direction. A +X-axis direction is a direction in a right-handed coordinate system. Specifically, when the thumb of the right hand is oriented in the +X-axis direction and the index finger in the +Y-axis direction, the middle finger points to the +Z-axis direction.

In the XYZ orthogonal coordinate system thus defined as described above, pixel electrodes 6 and common electrodes 7 are arrayed in the Y-axis directions. Pixel electrodes 6 and common electrodes 7, i.e., the comb-tooth electrodes, extend longitudinally in the X-axis directions. Liquid crystal display device 1 has a display screen lying in an XY plane. The structure in the Z-axis directions comprises backlight 16, back-side circular polarizer 8, back-side substrate 4, (reflector 14, insulating layer 15), liquid crystal layer 12, observer-side substrate 5, observer-side compensator 11, touch panel 13, and observer-side circular polarizer 9 which are stacked together in the order named.

Figure 4:
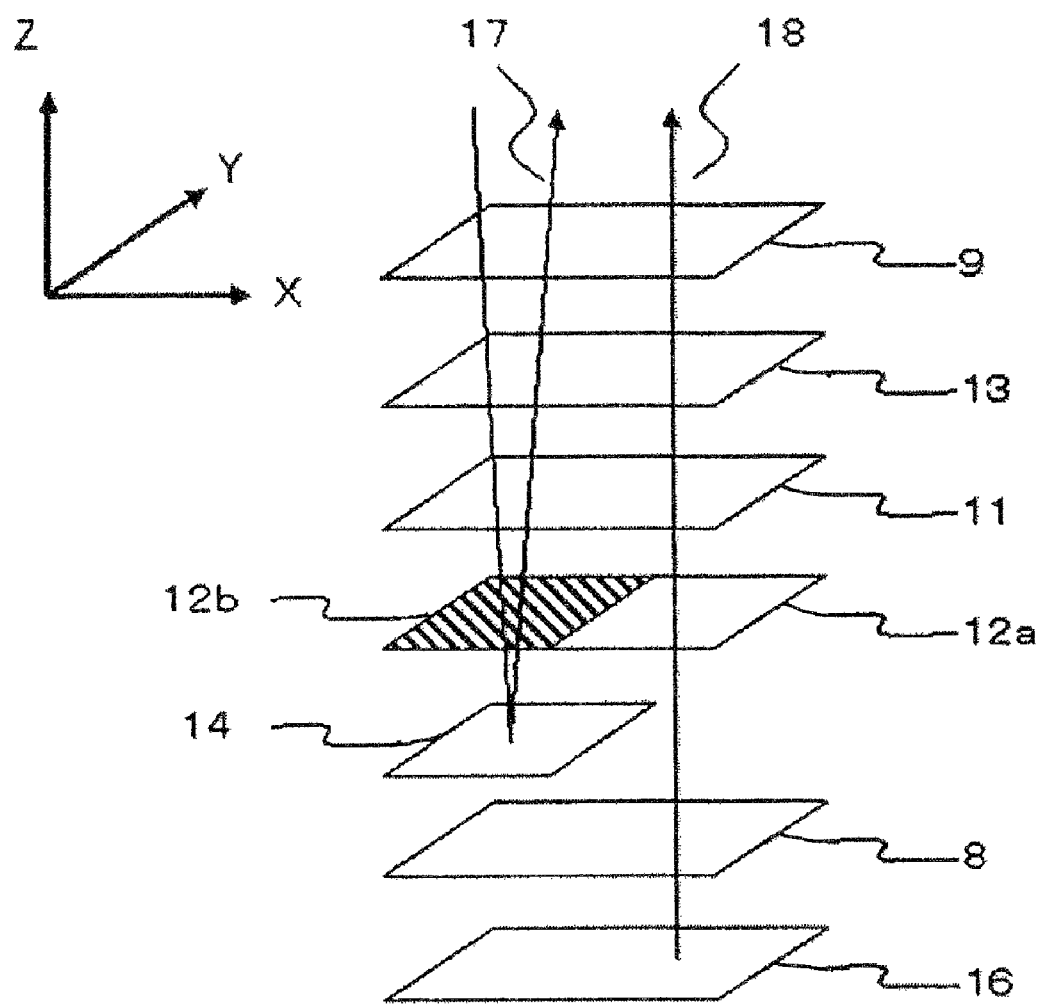
FIG. 4 is a schematic exploded perspective view showing a structure of the liquid crystal display device with the touch panel according to Exemplary Embodiment 1.

FIG. 4 is a schematic exploded perspective view showing a structure of liquid crystal display device 1 with the touch panel according to the present Exemplary Embodiment. In FIG. 4, an XYZ orthogonal coordinate system is defined in the same manner as with the XYZ orthogonal coordinate system shown in FIG. 3. However, the longitudinal directions of the comb-tooth electrodes may be defined differently in other than FIGS. 3 and 4.

As described above, the placement angle of the phase retarder is expressed as the angle formed between the retarder axis of the phase retarder and the X-axis. The counterclockwise direction as viewed from the +Z-axis direction is defined as positive. The placement angle of the polarizer is expressed as the angle formed between the absorption axis of the polarizer and the X-axis. The placement angle of the liquid crystal layer that is horizontally oriented is expressed as the angle formed between the orientation axis of the liquid crystal layer and the X-axis when no voltage is applied to the liquid crystal layer.

Observer-side circular polarizer 9 and back-side circular polarizer 8 are combined with each other such that the directions of circularly polarized light produced thereby are opposite to each other. For example, if observer-side circular polarizer 9 converts light traveling in the −Z-axis direction into right-handed circularly polarized light, then back-side circular polarizer 8 converts light traveling in the +Z-axis direction into left-handed circularly polarized light.

Reflective display region 2 and transmissive display region 3 of liquid crystal layers 12a, 12b are oriented parallel to each other by a general orienting process. In the present Exemplary Embodiment, the electrodes are formed such that liquid crystal layer 12b in the reflective display region is energized in a lateral electric field drive mode. However, liquid crystal layer 12b in the reflective display region may be energized in a vertical field drive mode.

Display operation of liquid crystal display device 1 will be described below with reference to FIG. 4. For the sake of brevity, it is assumed that light which passes through touch panel 13 has its polarized state unchanged by touch panel 13. Actually, since the refractive index of a transparent substrate (not shown) in touch panel 13 and the refractive index of the air layer therein are greatly different from each other, relatively surface reflections are caused by the interface between the transparent substrate and the air layer. At this time, the reflectances of S-polarized light and P-polarized light which are obliquely applied to touch panel 13 are different from each other in a certain entrance angle range. A portion of the light from backlight 16 which is reflected by the interface in touch panel 13 is reflected again by the interface toward the observer. Therefore, the light applied to touch panel 13 has its polarized state changed when it passes through touch panel 13. It is assumed that when circularly polarized light is reflected by the interface referred to above, it is converted into reversely circularly polarized light. Actually, since the reflectances of S-polarized light and P-polarized light are different from each other as described above, circularly polarized light reflected by the interface is converted into elliptically polarized light.

It is also assumed that observer-side compensator 11 and liquid crystal layer 12b cancel out a retardation and an oblique retardation. It is also assumed that observer-side compensator 11 and liquid crystal layer 12a cancel out a retardation and an oblique retardation. If a retardation is not canceled out, then the contrast ratio becomes poorer as the retardation that remains uncanceled is greater. It is also assumed that observer-side circular polarizer 9 passes right-handed circularly polarized light and back-side circular polarizer 8 passes left-handed circularly polarized light. However, observer-side circular polarizer 9 may pass left-handed circularly polarized light and back-side circular polarizer 8 may pass right-handed circularly polarized light. In other words, observer-side circular polarizer 9 and back-side circular polarizer 8 may pass only circularly polarized light opposite to each other.

A reflective display mode at the time the liquid crystal layers are not in operation will be described below with reference to FIG. 4. In the reflective display mode, reflected light path 17 is involved in the display. While the liquid crystal layers are not in operation, outside light applied to observer-side circular polarizer 9 is converted into right-handed circularly polarized light, which is emitted from observer-side circular polarizer 9. The right-handed circularly polarized light emitted from observer-side circular polarizer 9 is applied to touch panel 13, and is emitted from touch panel 13. The right-handed circularly polarized light emitted from touch panel 13 passes through observer-side compensator 11, from which it is applied to liquid crystal layer 12b in the reflective display region. As the liquid crystal layers are not in operation, observer-side compensator 11 cancels out the retardation of liquid crystal layer 12b. When the liquid crystal layers are not in operation, therefore, observer-side compensator 11 and liquid crystal layer 12b are isotropic with respect to the applied light. Therefore, the light that passes through observer-side compensator 11 and liquid crystal layer 12b remains to be the right-handed circularly polarized light.

The right-handed circularly polarized light emitted from liquid crystal layer 12b is applied to reflector 14 and is reflected thereby. At this time, the right-handed circularly polarized light is converted into left-handed circularly polarized light. The left-handed circularly polarized light is applied again to liquid crystal layer 12 and observer-side compensator 11. Since the retardation of liquid crystal layer 12b is canceled out by observer-side compensator 11 in the same manner as when the right-handed circularly polarized light travels toward reflector 14, the light emitted from observer-side compensator 11 remains to be the left-handed circularly polarized light. The left-handed circularly polarized light emitted from observer-side compensator 11 is emitted as left-handed circularly polarized light from touch panel 13.

The left-handed circularly polarized light emitted from touch panel 13 is applied to observer-side circular polarizer 9. However, inasmuch as observer-side circular polarizer 9 passes only right-handed circularly polarized light, it absorbs the left-handed circularly polarized light and does not emit light. In this manner, liquid crystal display device 1 displays black. In other words, liquid crystal display device 1 displays black in the reflective display mode while the liquid crystal layers are not in operation.

A transmissive display mode at the time the liquid crystal layers are not in operation will be described below. In the transmissive display mode, transmissive light path 18 is involved in the display. Light emitted from back light 16 is applied to back-side circular polarizer 8, which converts the light into left-handed circularly polarized light that is emitted from back-side circular polarizer 8. The left-handed circularly polarized light emitted from back-side circular polarizer 8 is applied successively to liquid crystal layer 12a and observer-side compensator 11. The retardation of liquid crystal layer 12a is canceled out by observer-side compensator 11. When the liquid crystal layers are not in operation, therefore, observer-side compensator 11 and liquid crystal layer 12a are isotropic with respect to the applied light. Therefore, the light that passes through observer-side compensator 11 and liquid crystal layer 12a remains to be the left-handed circularly polarized light and is applied to observer-side circular polarizer 9.

Inasmuch as observer-side circular polarizer 9 passes only right-handed circularly polarized light, it absorbs the left-handed circularly polarized light and does not emit light. In this manner, liquid crystal display device 1 displays black. In other words, liquid crystal display device 1 displays black in the transmissive display mode while the liquid crystal layers are not in operation, as with the reflective display mode.

A reflective display mode at the time the liquid crystal layers are in operation will be described below. Outside light which is converted into right-handed circularly polarized light by observer-side polarizer 9 has its polarized state unchanged by touch panel 13, and is applied to observer-side compensator 11 and liquid crystal layer 12b. At this time, the refractive index anisotropy of liquid crystal layer 12b has been changed by a voltage applied thereto. Therefore, the polarized state of the right-handed circularly polarized light that is applied to liquid crystal layer 12b is changed thereby. Specifically, the polarized state of the right-handed circularly polarized light that is applied to liquid crystal layer 12b is changed to a linearly polarized state or a polarized state close thereto. The degree to which the polarized state is changed differs depending on the voltage applied to liquid crystal layer 12b and the thickness of liquid crystal layer 12b. If the stacked assembly of observer-side compensator 11 and liquid crystal layer 12b functions as a quarter-wave plate, then it utilizes the outside light highly efficiently. When the circularly polarized light passes through the quarter-wave plate, it is converted into linearly polarized light thereby. The linearly polarized light that has passed through observer-side compensator 11 and liquid crystal layer 12b is applied to reflector 14, and is reflected thereby and applied again to liquid crystal layer 12b and observer-side compensator 11.

The linearly polarized light applied to the stacked assembly of liquid crystal layer 12b and observer-side compensator 11 is converted into right-handed circularly polarized light, which is applied to touch panel 13. The right-handed circularly polarized light applied to touch panel 13 has its polarized state unchanged by touch panel 13 and is applied to observer-side circular polarizer 9. Since observer-side circular polarizer 9 passes the right-handed circularly polarized light, it emits the light. Therefore, liquid crystal display device 1 displays white in the reflective display mode while the liquid crystal layers are in operation.

A transmissive display mode at the time the liquid crystal layers are in operation will be described below. Light emitted from back light 16 is applied to back-side circular polarizer 8, which converts the light into left-handed circularly polarized light. The left-handed circularly polarized light emitted from back-side circular polarizer 8 is applied successively to liquid crystal layer 12a and observer-side compensator 11. At this time, the refractive index anisotropy of liquid crystal layer 12a has been changed by a voltage applied thereto. Therefore, the polarized state of the left-handed circularly polarized light that is applied to liquid crystal layer 12a is changed thereby. Specifically, the left-handed circularly polarized light that is applied to liquid crystal layer 12a is converted into right-handed circularly polarized light. The degree to which the polarized state is changed differs depending on the voltage applied to liquid crystal layer 12a and the thickness of liquid crystal layer 12a. If the stacked assembly of liquid crystal layer 12a and observer-side compensator 11 functions as a half-wave plate, then it utilizes the outside light highly efficiently. When the circularly polarized light passes through the half-wave plate, it is converted into reversely circularly polarized light thereby. The right-handed circularly polarized light that has passed through liquid crystal layer 12a and observer-side compensator 11 has its polarized state unchanged by touch panel 13 and is applied to observer-side circular polarizer 9. Since observer-side circular polarizer 9 passes the right-handed circularly polarized light, it emits the light. Therefore, liquid crystal display device 1 displays white in the transmissive display mode while the liquid crystal layers are in operation, as with the reflective display mode.

As described above, liquid crystal display device 1 displays black in both the reflective display mode and the transmissive display mode while the light crystal layers are not in operation, and displays white in both the reflective display mode and the transmissive display mode while the light crystal layers are in operation. Accordingly, reflective display region 2 and transmissive display region 3 operate identically to each other.

If each of observer-side circular polarizer 9 and back-side circular polarizer 8 is of the single phase retarder design, then liquid crystal display device 1 requires two polarizers and three phase retarders as a whole. If each of observer-side circular polarizer 9 and back-side circular polarizer 8 is of the double phase retarder design, then liquid crystal display device 1 requires two polarizers and five phase retarders as a whole. Therefore, regardless whether each circular polarizer is of the single phase retarder design or the double phase retarder design, liquid crystal display device 1 can equalize the operation of reflective display region 2 and the operation of transmissive display region 3 while preventing the contrast ratio from being lowered due to the reflection by the touch panel, using fewer polarizers and phase retarders than with the liquid crystal display devices of the related art.

The touch panel which is mounted on the liquid crystal display device imposes a pressure to the liquid crystal display device. Other liquid crystal modes (e.g., a vertically oriented liquid crystal mode) employ the multidomain scheme for a wide field-of-view angle. However, multidomain liquid crystal display devices tend to have their domain layout disturbed under the pressure applied by the touch panel. If the domain layout is disturbed, then a pen or a finger that has moved on the touch panel is liable to leave its trace visible. The liquid crystal display device with the touch panel according to the present Exemplary Embodiment is less susceptible to the pressure applied by the touch panel as it is of the lateral electric field scheme.

Liquid crystal display device 1 with the touch panel according to the present Exemplary Embodiment offers the same advantages as those of the invention disclosed in Patent Document 1 because it includes a circular polarizer on the observer side. This feature holds true for all Exemplary Embodiments and Examples to be described below.

In the present description, it is assumed that the liquid molecules have positive dielectric constant anisotropy. However, the liquid molecules may have negative dielectric constant anisotropy.

The present invention is also applicable to a liquid crystal display device which is energizable according to an FFS (Fringe Field Switching) mode or an AFFS (Advanced Fringe Field Switching) mode.

Example 1

Figure 5:
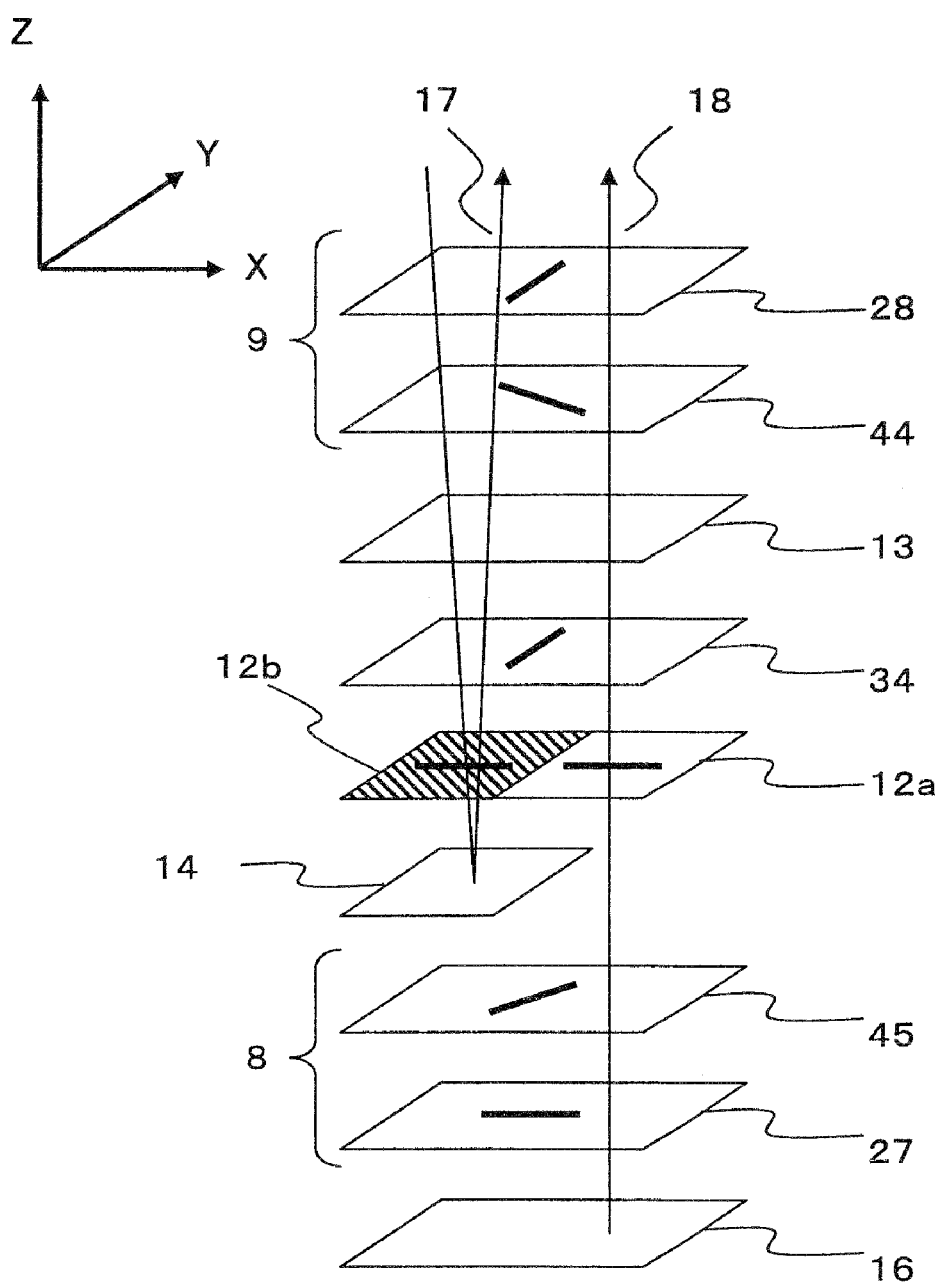
FIG. 5 is a schematic exploded perspective view showing a structure of the liquid crystal display device with the touch panel according to Example 1.

Example 1 of liquid crystal display device with a touch panel according to Exemplary Embodiment 1 will be described in specific detail below. FIG. 5 is a schematic exploded perspective view showing a structure of a liquid crystal display device with a touch panel according to Example 1.

In the liquid crystal display device with the touch panel according to Example 1, each of back-side circular polarizer 8 and observer-side circular polarizer 9 is of the single phase retarder design. Back-side circular polarizer 8 includes phase retarder 45 having an Nz coefficient of 0, and observer-side circular polarizer 9 includes phase retarder 44 having an Nz coefficient of 1.

If the transmissive display region of the liquid crystal display device according to the present Example is viewed from the display screen, then it comprises polarizer 28 (placement angle: 90 degrees), reverse dispersion quarter-wave plate 44 (Nz=1, placement angle: 135 degrees), touch panel 13, quarter-wave plate 34 (Nz=0, placement angle: 90 degrees), liquid crystal layer 12a (retardation value: 137.5 nm, placement angle: 0 degree), reverse dispersion quarter-wave plate 45 (Nz=0, placement angle: 45 degrees), and polarizer 27 (placement angle: 0 degree) which are stacked together in the order named.

If the reflective display region of the liquid crystal display device according to the present Example is viewed from the display screen, then it comprises polarizer 28 (placement angle: 90 degrees), reverse dispersion quarter-wave plate 44 (Nz=1, placement angle: 135 degrees), touch panel 13, quarter-wave plate 34 (Nz=0, placement angle: 90 degrees), liquid crystal layer 12b (retardation value: 137.5 nm, placement angle: 0 degree), and reflector 14 which are stacked together in the order named.

As retardation of the reverse dispersion quarter-wave plate increases, so will the wavelength increases.

In FIG. 5, heavy lines illustrated in polarizer 28 and 27 indicate absorption axis thereof, heavy lines illustrated in phase retarder 44, 34 and 45 indicate retarder axis thereof and heavy lines illustrated in liquid crystal layer 12a and 12b indicate orientation axis thereof.

Both liquid crystal layers 12a, 12b are energized according to the lateral electric field mode. The electric field is directed at an angle of −75 degrees with respect to the orientation axis of liquid crystal layers 12a, 12b.

For evaluating the field-of-view angle characteristics of the contrast ratio of the liquid crystal display device with the touch panel according to the present Example, Table 1 below shows refractive indexes of the reverse dispersion quarter-wave plate with Nz=1. The method of evaluating the field-of-view angle characteristics will be described later with respect to Example 2-1.

Figure 6:
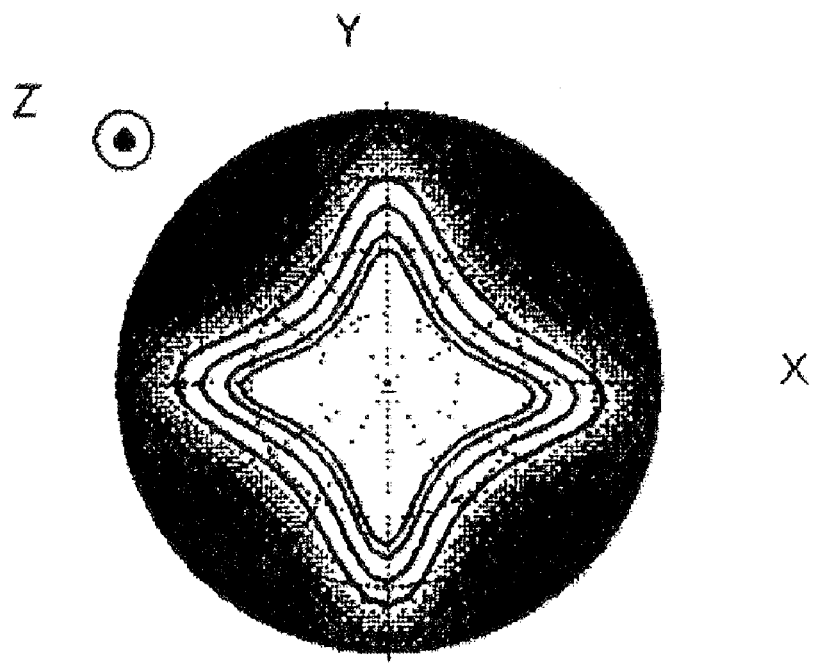
FIG. 6 is an equal-contrast diagram showing field-of-view angle characteristics of a transmissive display region of the liquid crystal display device with the touch panel according to Example 1.
Figure 7:
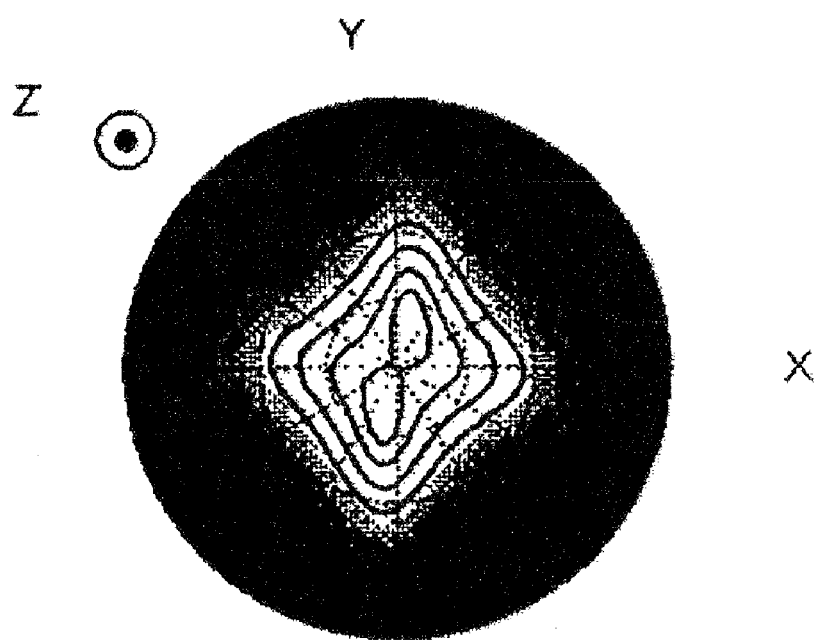
FIG. 7 is an equal-contrast diagram showing field-of-view angle characteristics of a reflective display region of the liquid crystal display device with the touch panel according to Example 1.

FIGS. 6 and 7 are equal-contrast diagrams of the evaluated field-of-view angle characteristics. Specifically, FIGS. 6 and 7 show the field-of-view angle characteristics of the transmissive and reflective display regions of the liquid crystal display device with the touch panel according to the present Example. Details of the equal-contrast diagrams will be described later with respect to Example 2-1.

TABLE 1

| Phase retarder | Wavelength (nm) | nx | ny | nz |
|---|---|---|---|---|
| Reverse dispersion quarter-wave plate with Nz = 1 | 400 | 1.502 | 1.5 | 1.5 |
| | 500 | 1.5025 | 1.5 | 1.5 |
| | 600 | 1.503 | 1.5 | 1.5 |

The liquid crystal display device with the touch panel according to the present Example comprises two polarizers and three phase retarders, whereas the liquid crystal display device with the touch panel according to the combination of the related arts comprises at least three polarizers and five phase retarders. Therefore, the liquid crystal display device with the touch panel according to the present Example is one polarizer and two phase retarders less than, and hence smaller in cost and thickness than, the liquid crystal display device with the touch panel according to the combination of the related arts.

Even if the comb-tooth electrodes in the transmissive display region are made of a material such as Cr or the like whose reflectance is higher than ITO, the contrast ratio for the reflective display (black display) with the liquid crystal layers being not in operation is prevented from being lowered.

An example in which the comb-tooth electrodes in the transmissive display region are made of Cr will be described below. If the transmissive display region is viewed from the display screen while the liquid crystal layers are not in operation, it comprises polarizer 28, reverse dispersion quarter-wave plate 44, touch panel 13, quarter-wave plate 34, liquid crystal layer 12a, and the Cr electrodes. This structure is identical to that of the reflective display region except for the Cr electrodes and reflector 14. Since outside light applied while the liquid crystal layers are not in operation is reflected by the Cr electrodes in the transmissive display region, the contrast ratio in the reflective display region is not lowered.

Example 2 to be described later wherein the comb-tooth electrodes in the transmissive display region are made of Cr will be described below. The liquid crystal display device with the touch panel according to Example 2 and the liquid crystal display device with the touch panel according to Example 1 are different from each other as to the retardation value of liquid crystal layer 12a. Specifically, the retardation value of liquid crystal layer 12a according to Example 1 is 137.5 nm, whereas the retardation value of liquid crystal layer 12a according to Example 2 is 275 nm. According to Example 2, the transmissive display region as seen from the display screen while the liquid crystal layers are not in operation comprises observer-side circular polarizer 9, touch panel 13, quarter-wave plate 34 (Nz=0, placement angle: 90 degrees), liquid crystal layer 12a (retardation value: 275 nm, placement angle: 0 degree), and the Cr electrodes which are stacked together in the order named. The stacked assembly of quarter-wave plate 34 with Nz=0 and liquid crystal layer 12a is equivalent to quarter-wave plate 34 with Nz=1 (placement angle: 0 degree). Light that has passed through observer-side circular polarizer 9 is converted thereby into circularly polarized light, which is converted into linearly polarized light upon passage through the stacked assembly of quarter-wave plate 34 and liquid crystal layer 12a. The linearly polarized light is reflected by the Cr electrodes, and converted into circularly polarized light when it passes again through the stacked assembly of quarter-wave plate 34 and liquid crystal layer 12a. The circularly polarized light passes through observer-side circular polarizer 9 because it has been polarized in a direction capable of passing through observer-side circular polarizer 9. As the outside light is reflected by the Cr electrodes in the transmissive display region, the contrast ratio in the reflective display region is lowered.

In Example 2 to be described later, the liquid crystal display device displays white as the orientation axis of the liquid crystal moves through 45 degrees with respect to the field direction. In Example 1, the liquid crystal display device displays white as the orientation axis of the liquid crystal moves through 75 degrees with respect to the field direction. Therefore, the drive voltage applied in Example 1 increases.

In Example 1, the circular polarizer is of the single phase retarder design. However, the circular polarizer may be of the double phase retarder design.

Exemplary Embodiment 2

A liquid crystal display device with a touch panel according to Exemplary Embodiment 2 will be described below. The liquid crystal display device with the touch panel according to Exemplary Embodiment 2 is characterized in that a back-side compensator for reducing the refractive index anisotropy of the liquid crystal layer in the transmissive display region is disposed between the back-side circular polarizer and the back-side substrate. The liquid crystal display device with the touch panel according to Exemplary Embodiment 2 will be described in specific detail with reference to FIG. 8.

Figure 8:
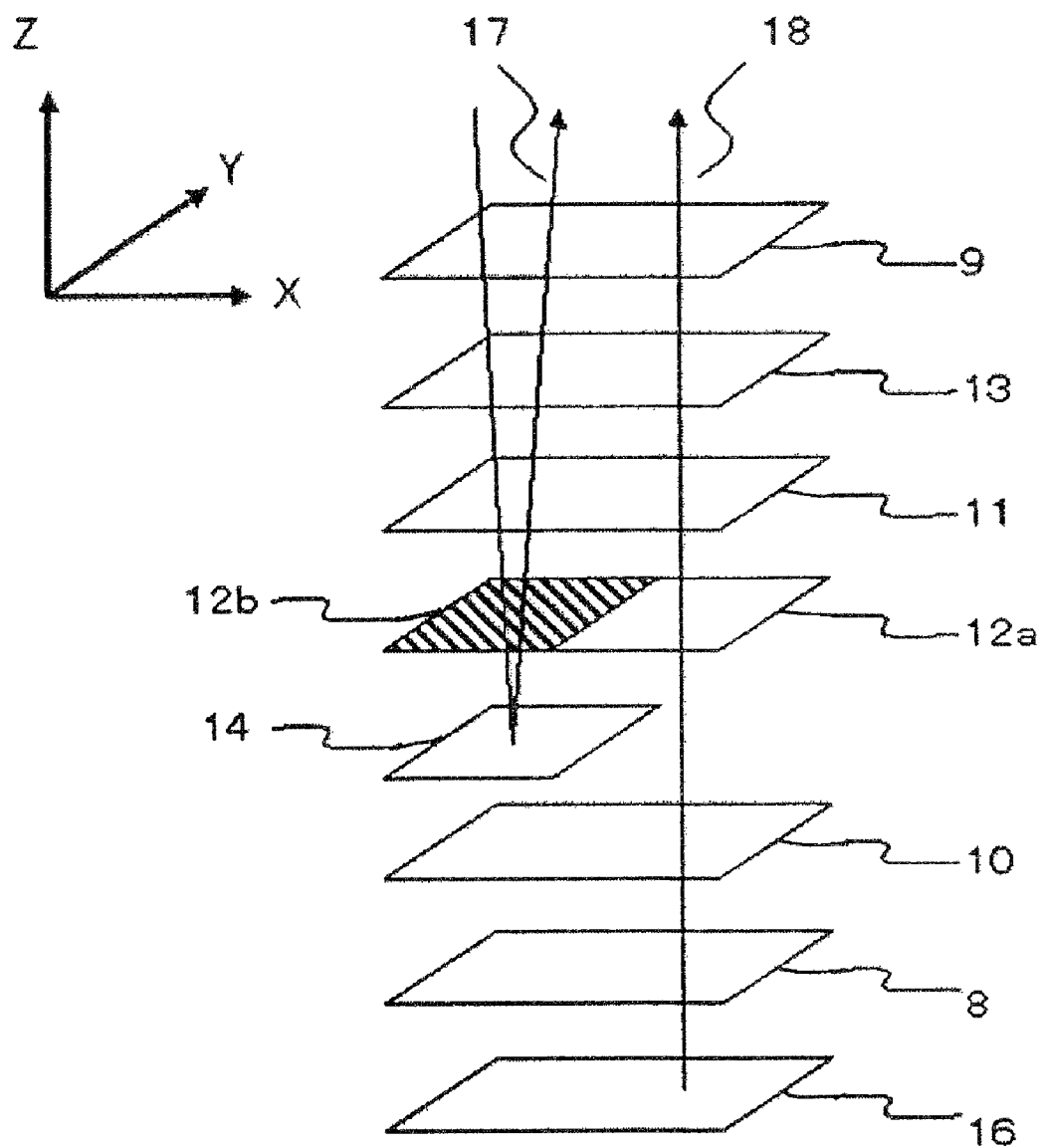
FIG. 8 is a schematic exploded perspective view showing a structure of the liquid crystal display device with the touch panel according to Exemplary Embodiment 2.

As shown in FIG. 8, if the transmissive display region of the liquid crystal display device with the touch panel according to the present Exemplary Embodiment is viewed from the display screen, then it comprises observer-side circular polarizer 9, touch panel 13, observer-side compensator 11, liquid crystal layer 12a, back-side compensator 10, and back-side circular polarizer 8 which are stacked together in the order named.

If the reflective display region is viewed from the display screen, then it comprises observer-side circular polarizer 9, touch panel 13, observer-side compensator 11, liquid crystal layer 12b, and reflector 14 which are stacked together in the order named.

The structure of the reflective display region is identical to that of the reflective display region according to Exemplary Embodiment 1, and the structure of the transmissive display region is different from that of the transmissive display region according to Exemplary Embodiment 1. In Exemplary Embodiment 1, observer-side compensator 11 reduces (cancels out) the retardation and the oblique retardation of liquid crystal layer 12a. In Exemplary Embodiment 2, however, back-side compensator 10 and observer-side compensator 11 reduce (cancel out) the retardation and the oblique retardation of liquid crystal layer 12a.

Specifically, while the liquid crystal layers are not in operation, the trans-missive display region displays black as with Exemplary Embodiment 1 because the retardation of liquid crystal layer 12a in the transmissive display region is canceled by back-side compensator 10 and observer-side compensator 11.

Light emitted from back light 16 when the liquid crystal layers are in operation is applied to back-side circular polarizer 8 and converted thereby into left-handed circularly polarized light. The left-handed circularly polarized light is applied successively to back-side compensator 10, liquid crystal layer 12a, and observer-side compensator 11. As the refractive index anisotropy of liquid crystal layer 12a has been changed by a voltage applied thereto, the polarized state of the left-handed circularly polarized light is changed thereby. The degree to which the polarized state is changed differs depending on the voltage applied to liquid crystal layer 12a and the thickness of liquid crystal layer 12a. If the stacked assembly of back-side compensator 10, liquid crystal layer 12a, and observer-side compensator 11 functions as a half-wave plate, then it utilizes the outside light highly efficiently. When the left-handed circularly polarized light is applied to the stacked assembly, it is converted thereby into right-handed linearly polarized light, which is emitted from the stacked assembly. Since touch panel 13 does not change the polarized state of the applied light, the right-handed circularly polarized light that is applied to observer-side circular polarizer 9 passes therethrough, displaying white.

In this manner, a lateral-field-driven semitransmissive liquid crystal display device of a normally black mode is realized.

Since observer-side compensator 11 and back-side compensator 10 reduce the refractive index anisotropy of liquid crystal layer 12a, the drive voltage applied to liquid crystal layer 12a may be lower than if the refractive index anisotropy of liquid crystal layer 12a is reduced by a single observer-side compensator.

The transmittance of the liquid crystal display device can be controlled by changing the optical characteristics of liquid crystal layer 12a when a voltage is applied to liquid crystal layer 12a in the transmissive display region that is disposed between observer-side circular polarizer 9 and back-side circular polarizer 8. Specifically, the optical characteristics of liquid crystal layer 12a are switched between a state for keeping the polarized state of circularly polarized light unchanged and a state for changing circularly polarized light to reversely circularly polarized light, thereby increasing the transmittance for displaying a fully white image and reducing the transmittance for displaying a fully black image. However, since liquid crystal layer 12a in the transmissive display region is energized according to the lateral electric field mode, a change caused in the optical characteristics by an applied voltage results in a change in the orientation axis more dominantly than a change in the retardation. Consequently, a fixed phase retarder and a phase retarder whose retarder axis rotates about the Z-axis need to switch between a state for keeping the polarized state of circularly polarized light unchanged and a state for changing circularly polarized light to reversely circularly polarized light. For accomplishing such state switching with observer-side compensator 11 and liquid crystal layer 12a, the retardation of observer-side compensator 11 and liquid crystal layer 12a is set to about a quarter wavelength. Specifically, if the orientation axes of observer-side compensator 11 and liquid crystal layer 12a are perpendicular to each other, then the retardation is reduced, and the circular polarized light remains unchanged. If the orientation axes of observer-side compensator 11 and liquid crystal layer 12a are parallel to each other, then the stacked assembly of observer-side compensator 11 and liquid crystal layer 12a may be retarded as a half-wave plate. Therefore, the circularly polarized light that has passed through the stacked assembly of observer-side compensator 11 and liquid crystal layer 12a is converted into reversely circularly polarized light. The above state switching can also be achieved by setting the retardation of observer-side compensator 11 and liquid crystal layer 12a in the transmissive display region to a three-quarter wavelength or five-quarter wavelength. With such a retardation setting, however, the compensator and the liquid crystal layer possibly tend to have an increased thickness and suffer burn-in.

If the retardation of observer-side compensator 11 and liquid crystal layer 12a is set to about a half wavelength, then the light applied to the liquid crystal layer is converted into reversely circularly polarized light regardless of the orientation axis of liquid crystal layer 12a. Thereafter, the reversely circularly polarized light is converted back to the original circularly polarized light by observer-side compensator 11. Therefore, the polarized state changes a little, and no sufficient contrast ratio is achieved. This holds true also when the retardation of observer-side compensator 11 and liquid crystal layer 12a is set to a three-half wavelength or a five-half wavelength.

If the retardation of observer-side compensator 11 and liquid crystal layer 12a is in the range from 0 to a quarter wavelength or in the range from a quarter wavelength to a half wavelength, then the liquid crystal display device exhibits characteristics between the quarter wavelength and the half wavelength.

When observer-side compensator 11 and back-side compensator 10 reduce the refractive index anisotropy of liquid crystal layer 12a in the transmissive display region, switching may be made between the polarized states by setting the retardation of observer-side compensator 11 and back-side compensator 10 to a quarter wavelength and also setting the retardation of liquid crystal layer 12a in the transmissive display region to a half wavelength. In other words, when the angle of the retarder axis of observer-side compensator 11 and back-side compensator 10 is 90 degrees and the angle of the retarder axis of liquid crystal layer 12a is 0 degree, the circularly polarized light remains unchanged. When the angle of the retarder axis of liquid crystal layer 12a is changed to 45 degrees, the circularly polarized light is converted into reversely circularly polarized light. As the angle of the retarder axis of liquid crystal layer 12a may be changed by 45 degrees, the drive voltage applied to the liquid crystal layer is lower than if the angle of the retarder axis of liquid crystal layer 12a is changed by 90 degrees.

As described above, the voltage operation of the reflective display region and the voltage operation of the transmissive display region are equalized to each other. Regardless whether the circular polarizer is of the single phase retarder design or the double phase retarder design, the liquid crystal display device is one polarizer and one phase retarder less than, and hence smaller in cost and thickness than, the liquid crystal display device with the touch panel according to the combination of the related art.

Observer-side compensator 11 may cancel the refractive index anisotropy of liquid crystal layer 12a in the transmissive display region. Alternatively, observer-side compensator 11 and back-side compensator 10 may reduce the refractive index anisotropy of liquid crystal layer 12a in the transmissive display region.

If the cancellation of the refractive index anisotropy of liquid crystal layer 12a with observer-side compensator 11 is used for black display, then since the luminance of black display is reduced, the contrast ratio is increased. The isotropization of the refractive index anisotropy means both the isotropization of an in-plane refractive index anisotropy and the isotropization of a thicknesswise refractive index anisotropy. The isotropization of the refractive index anisotropy is effective to increase the contrast ratio in the frontal direction of the liquid crystal display device and also to increase the contrast ratio in the oblique directions of the liquid crystal display device.

Similarly, the contrast ratio is increased when observer-side compensator 11 and back-side compensator 10 reduce the refractive index anisotropy of liquid crystal layer 12a in the transmissive display region.

Example 2-1

Figure 9:
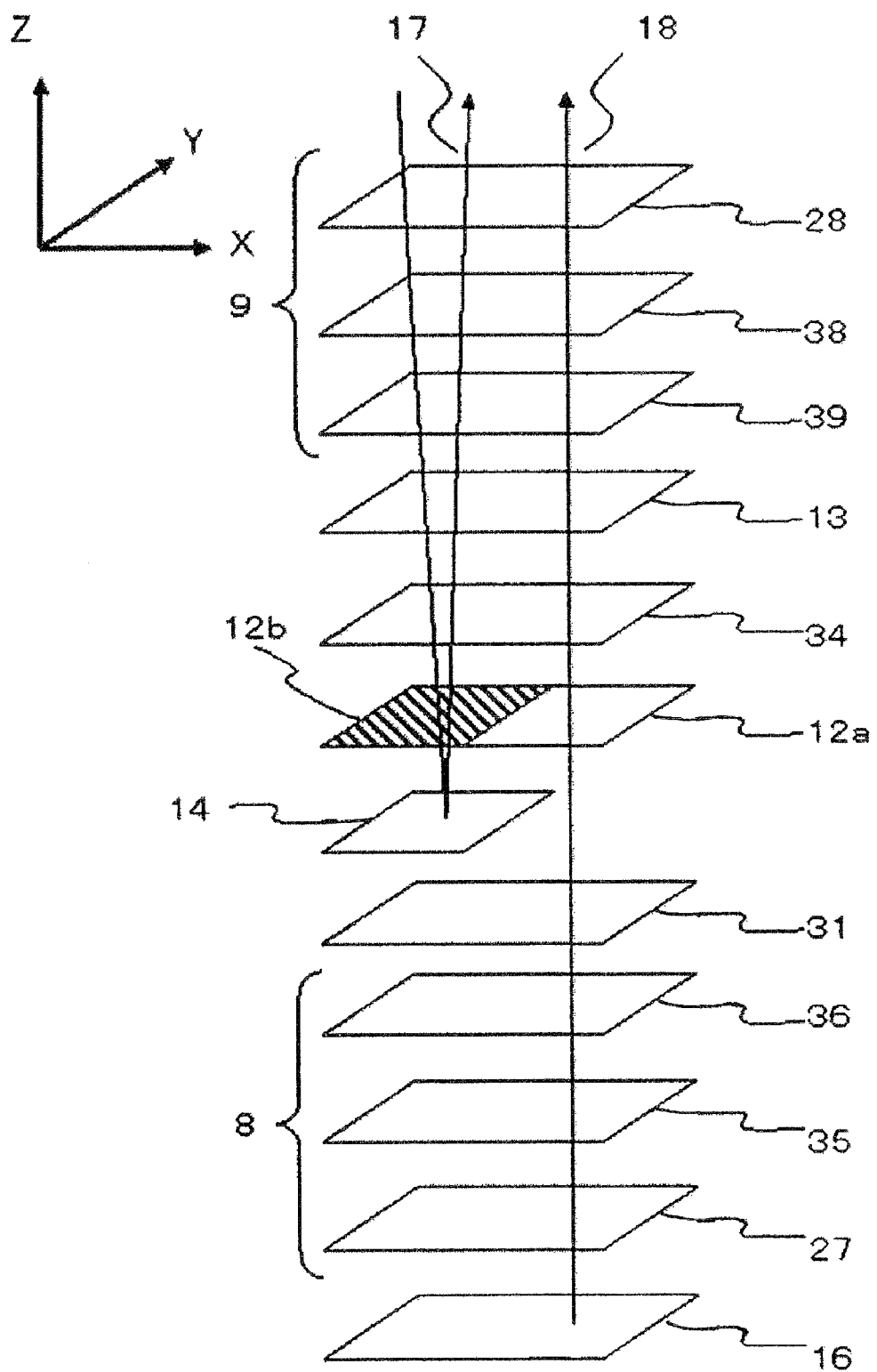
FIG. 9 is a schematic exploded perspective view showing a structure of a liquid crystal display device with a touch panel according to Example 2-1.

A liquid crystal display device with a touch panel according to Example 2-1 will be described in specific detail below. FIG. 9 is a schematic exploded perspective view showing a structure of a liquid crystal display device with a touch panel according to Example 2-1.

As shown in FIG. 9, each of back-side circular polarizer 8 and observer-side circular polarizer 9 is of the double phase retarder design. Four phase retarders of circular polarizers 8, 9 have an Nz coefficient of 0.5.

If the transmissive display region of the liquid crystal display device with the touch panel according to Example 2-1 is viewed from the display screen, then it comprises polarizer 28, half-wave plate 38 (Nz=0.5), quarter-wave plate 39 (Nz=0.5), touch panel 13, quarter-wave plate 34 (Nz=0), liquid crystal layer 12a, quarter-wave plate 31 (Nz=0), quarter-wave plate 36 (Nz=0.5), half-wave plate 35 (Nz=0.5), and polarizer 27 which are stacked together in the order named.

If the reflective display region of the liquid crystal display device is viewed from the display screen, then it comprises polarizer 28, half-wave plate 38 (Nz=0.5), quarter-wave plate 39 (Nz=0.5), touch panel 13, quarter-wave plate 34 (Nz=0), liquid crystal layer 12b, and reflector 14 which are stacked together in the order named.

Polarizer 28, half-wave plate 38, and quarter-wave plate 39 jointly make up observer circular polarizer 9. Quarter-wave plate 36, half-wave plate 35, and polarizer 27 jointly make up back-side circular polarizer 8. Quarter-wave plate 34 corresponds to observer-side compensator 11 shown in FIG. 8, and quarter-wave plate 31 to back-side compensator 10 shown in FIG. 8.

If the XYZ orthogonal coordinate system is defined in the same manner as shown in FIG. 4, then the above components have respective placement angles described below. As described above, the placement angle of the phase retarder is expressed as the angle formed between the retarder axis and the X-axis. The counterclockwise direction as viewed from the +Z-axis direction is defined as positive. The placement angle of the polarizer is expressed as the angle formed between the absorption axis of the polarizer and the X-axis. The placement angle of the liquid crystal layer that is horizontally oriented is expressed as the angle formed between the orientation axis of the liquid crystal layer and the X-axis when no voltage is applied to the liquid crystal layer.

Polarizer 28: 90 degrees
Half-wave plate 38: 100 degrees
Quarter-wave plate 39: 155 degrees
Quarter-wave plate 34: 90 degrees
Liquid crystal layers 12a, 12b: 0 degree
Quarter-wave plate 31: 90 degrees
Quarter-wave plate 36: 65 degrees
Half-wave plate 35: 10 degrees
Polarizer 27: 0 degree The direction of the electric field extends at −75 degrees with respect to the placement angle of liquid crystal layers 12a, 12b. In other words, the longitudinal direction of the comb-toothed electrodes has an angle of +15 degrees with respect to the placement angle of liquid crystal layers 12a, 12b.

Liquid crystal layer 12a in the transmissive display region has Re(0) of 275 nm, and liquid crystal layer 12b in the reflective display region has Re(0) of 137.5 nm. The transmissive display region and the reflective display region of liquid crystal layers 12a, 12b are energized according to the lateral electric field mode.

Since observer-side circular polarizer 9 is disposed on the observer side of touch panel 13 in Example 2-1, the contrast ratio is prevented from being lowered by outside light which would be reflected in touch panel 13 toward the observer.

A black display mode at the time the liquid crystal layer in the transmissive display region is not in operation will be described below. In the stacked assembly of quarter-wave plate 31, liquid crystal layer 12a, and quarter-wave plate 34 in the transmissive display region, the orientation axis of liquid crystal layer 12a and the retarder axis of quarter-wave plates 31, 34 are perpendicular to each other. The retardation (275 nm) of liquid crystal layer 12a and the total retardation (275 nm) of quarter-wave plates 31, 34 are equal to each other. Therefore, the retardations on light that is applied to the stacked assembly along the Z-axis directions are canceled out. The stacked assembly is thus optically isotropic. At this time, if the retardation values are different and hence are not sufficiently canceled out, then the contrast ratio is lowered.

The liquid crystal layer which is horizontally oriented has an Nz coefficient of 1, and quarter-wave plates 31, 34 have an Nz coefficient of 0. Therefore, the retardations on light that is inclined to the Z-axis are also canceled out. Thus, the stacked assembly is nearly isotropic with respect to light that is inclined to the Z-axis.

When the stacked assembly of quarter-wave plate 31, liquid crystal layer 12a, and quarter-wave plate 34 is nearly isotropic, the light that has passed through back-side circular polarizer 8 has its polarized state unchanged by the stacked assembly and touch panel 13, and reaches observer-side circular polarizer 9. Since observer-side circular polarizer 9 passes only circularly polarized light that is reverse to the circularly polarized light which can pass through back-side circular polarizer 8, the light that has reached observer-side circular polarizer 9 does not pass through observer-side circular polarizer 9, and the transmissive display region displays black.

Inasmuch as the stacked assembly of quarter-wave plate 31, liquid crystal layer 12a, and quarter-wave plate 34 is nearly isotropic, the stacked assembly of quarter-wave plate 36, quarter-wave plate 31, liquid crystal layer 12a, quarter-wave plate 34, and quarter-wave plate 39 can be regarded as the stacked assembly of quarter-wave plates 36, 39. Quarter-wave plates 36, 39 have the same retardation value and have respective retarder axes perpendicular to each other. Quarter-wave plates 36, 39 have an Nz coefficient of 0.5, as described above. Since the Nz coefficient is of 0.5, Re(0)≈Re(θ) is satisfied with respect to not only light in the Z-axis directions, but also light inclined to the Z-axis directions. In the other words, the range of angles θ in which Re(0)≈Re(θ) is satisfied is wide. Accordingly, the stacked assembly of quarter-wave plates 36, 39 is nearly isotropic. It follows from the above description that when the liquid crystal layer is not in operation, the phase between polarizers 27, 28 is nearly isotropic. Therefore, the field-of-view angle characteristics of the black display mode in the transmissive display region are better than if the Nz coefficient of the phase retarder is not taken into account.

A black display mode at the time the liquid crystal layer in the reflective display region is not in operation will be described below. Quarter-wave plate 34 and liquid crystal layer 12b have the same retardation values and have the retarder axis and the orientation axis perpendicular to each other. Therefore, the stacked assembly of quarter-wave plate 34 and liquid crystal layer 12b is isotropic with respect to light in the Z-axis directions. Since liquid crystal layer 12b has an Nz coefficient of 1.0 and quarter-wave plate 34 has an Nz coefficient of 0, the retardations on light that is inclined to the Z-axis directions are canceled out. Thus, the stacked assembly of quarter-wave plate 34 and liquid crystal layer 12b is also isotropic with respect to light inclined to the Z-axis directions. At this time, if the retardation values are different and hence are not sufficiently canceled out, then the contrast ratio is lowered.

Polarizer 28, half-wave plate 38, and quarter-wave plate 39 make up observer-side circular polarizer 9 with respect to light applied along the Z-axis directions. Observer-side circular polarizer 9 comprises a wide-band circular polarizer. Phase retarders 38, 39 of observer-side circular polarizer 9 have an Nz coefficient of 0.5. Accordingly, the retardation values of phase retarders 38, 39 with respect to light in the Z-axis directions and the retardation values thereof with respect to light inclined to the Z-axis directions are in agreement with each other in a wide range.

Light that has passed through observer-side circular polarizer 9 is thus circularly polarized in a wide angle range. The circularly polarized light has its polarized state unchanged by touch panel 13 and also by the stacked assembly of quarter-wave plate 34 and liquid crystal layer 12b, and reaches reflector 14. When the circularly polarized light is reflected by reflector 14, the direction of polarization is reversed. The circularly polarized light with the reversed direction of polarization has its polarized state unchanged by the stacked assembly of quarter-wave plate 34 and liquid crystal layer 12b and also by touch panel 13, and reaches observer-side circular polarizer 9. Since observer-side circular polarizer 9 does not pass the reversely circularly polarized light, the reflective display region displays black. As described above, not only light parallel to the normal line of the wide-band circular polarizer, but also light inclined at the angle θ to the normal line are converted into circularly polarized light. In addition, the range of the angle θ is wide. Consequently, the field-of-view angle characteristics of the black display mode in the reflective display region are increased.

For evaluating the field-of-view angle characteristics of the contrast ratio, Table 2 below shows refractive indexes of the half-wave plate with Nz=0.5. The parameters required to evaluate the field-of-view angle characteristics are as follows: Liquid crystal layer 12a in the transmissive display region has a refractive index anisotropy Δn of about 0.076 (wavelength of 550 nm), and has a thickness of about 3.63 μm. As with general liquid crystals, liquid crystal layer 12a has such a wavelength dependency that the refractive index anisotropy is greater at shorter wavelengths. The liquid crystal layer that is horizontally oriented has an Nz coefficient of 1.0. Phase retarders having the same refractive indexes as those shown in Table 2 and different thicknesses are used as phase retarders whose retardations are different from those of the quarter-wave plates. Even though the Nz coefficients of the phase retarders are different, their nx and ny values are the same as the nx and ny values of the phase retarder with the Nz coefficient of 0.5. The nz values of the phase retarders are determined dependent on the Nz coefficients of the phase retarders. Specifically, the nz values are calculated according to the equation (1). Refractive indexes with respect to light other than those having wavelengths of 400, 500, 600 nm are determined according to the Cauchy's equation. It is assumed that even if the Nz coefficients are different, the wavelength dispersions of the refractive indexes are the same. Actually, if the Nz coefficients are different, then since the materials are often different, the wavelength dispersions of the refractive indexes may possibly be different.

TABLE 2

| Phase retarder | Wavelength (nm) | nx | ny | nz |
|---|---|---|---|---|
| Half-wave plate with Nz = 0.5 | 400 | 1.5887 | 1.5835 | 1.5861 |
|  | 500 | 1.5882 | 1.5835 | 1.5858 |
|  | 600 | 1.5879 | 1.5835 | 1.5857 |

Figure 10:
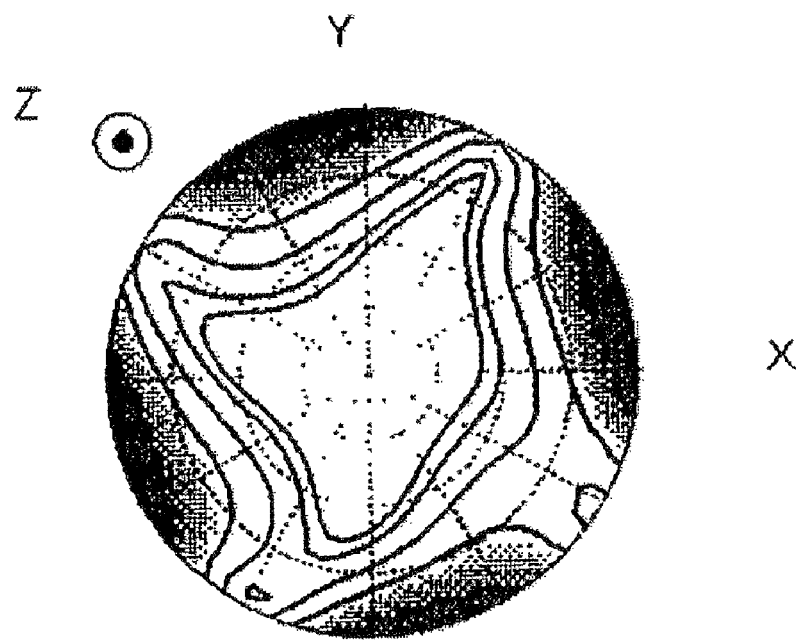
FIG. 10 is an equal-contrast diagram showing field-of-view angle characteristics of a transmissive display region of the liquid crystal display device with the touch panel according to Example 2-1.

FIG. 10 is an equal-contrast diagram showing field-of-view angle characteristics of the transmissive display region of the liquid crystal display device with the touch panel according to Example 2-1. The field-of-view angle characteristics were evaluated also in view of the air layer in the touch panel. In the other equal-contrast diagrams of the accompanying drawings, the air layer in the touch panel was taken into account. The contrast is expressed in values produced by dividing the luminance of a fully white image generated when a voltage is applied to the liquid crystal layer until the luminance is maximum, by the luminance of a fully black image generated when no voltage is applied to the liquid crystal layer. X-, Y-, and Z-axes shown in FIG. 10 are defined in the same manner as with the coordinate axes shown in FIG. 9.

The central point of circles in the equal-contrast diagram represent a contrast value achieved when the liquid crystal display device is viewed from the Z-axis directions. The four concentric circles represent contrast values achieved when the liquid crystal display device is viewed from directions inclined at 20, 40, 60, and 80 degrees, respectively, to the Z-axis directions. Equal contrast lines represent contrast values 300, 200, 100, 50, 10 arranged successively outwardly in the order named.

Half-wave plates 35, 38 which are paired may be made of the same material. Quarter-wave plates 36, 39 which are paired may also be made of the same material. As a result, the contrast ratio in the transmissive display region is increased.

Figure 11:
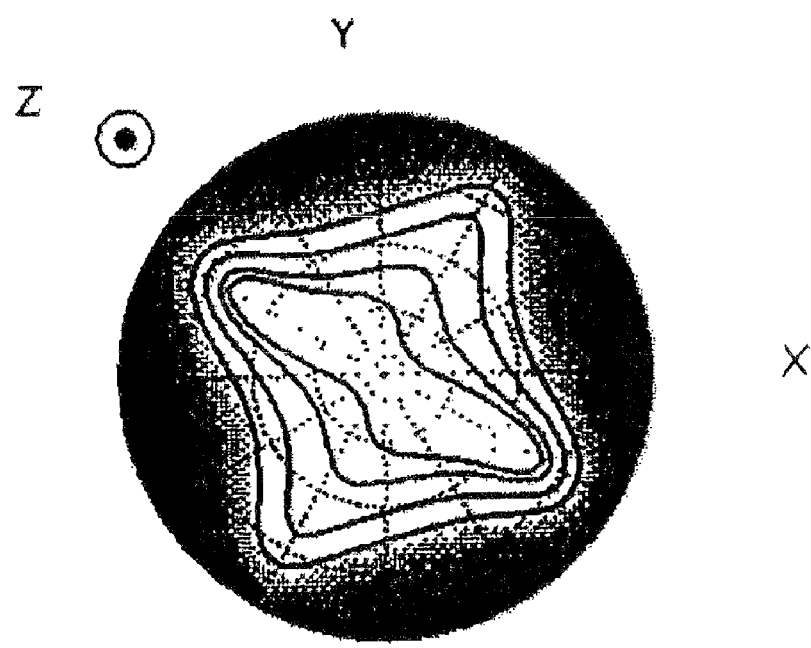
FIG. 11 is an equal-contrast diagram showing field-of-view angle characteristics of a reflective display region of the liquid crystal display device with the touch panel according to Example 2-1.

FIG. 11 is an equal-contrast diagram showing field-of-view angle characteristics of the reflective display region of the liquid crystal display device with the touch panel according to Example 2-1. The field-of-view angle characteristics were evaluated in the same manner as described above with reference to FIG. 10. The contrast values represented by the equal contrast lines are defined in the same manner as described above with reference to FIG. 10. X-, Y- and Z-axes shown in FIG. 11 are defined in the same manner as with the coordinate axes shown in FIG. 9.

In Example 2-1, the retardation of liquid crystal layer 12a in the transmissive display region is represented by about a half wavelength. However, the retardation of liquid crystal layer 12a is variable. When the retardation of liquid crystal layer 12a varied, the retardations of observer-side compensator 11 and back-side compensator 10 are also varied. The retardation of liquid crystal layer 12b in the reflective display region is also variable.

Example 2-2

Figure 12:
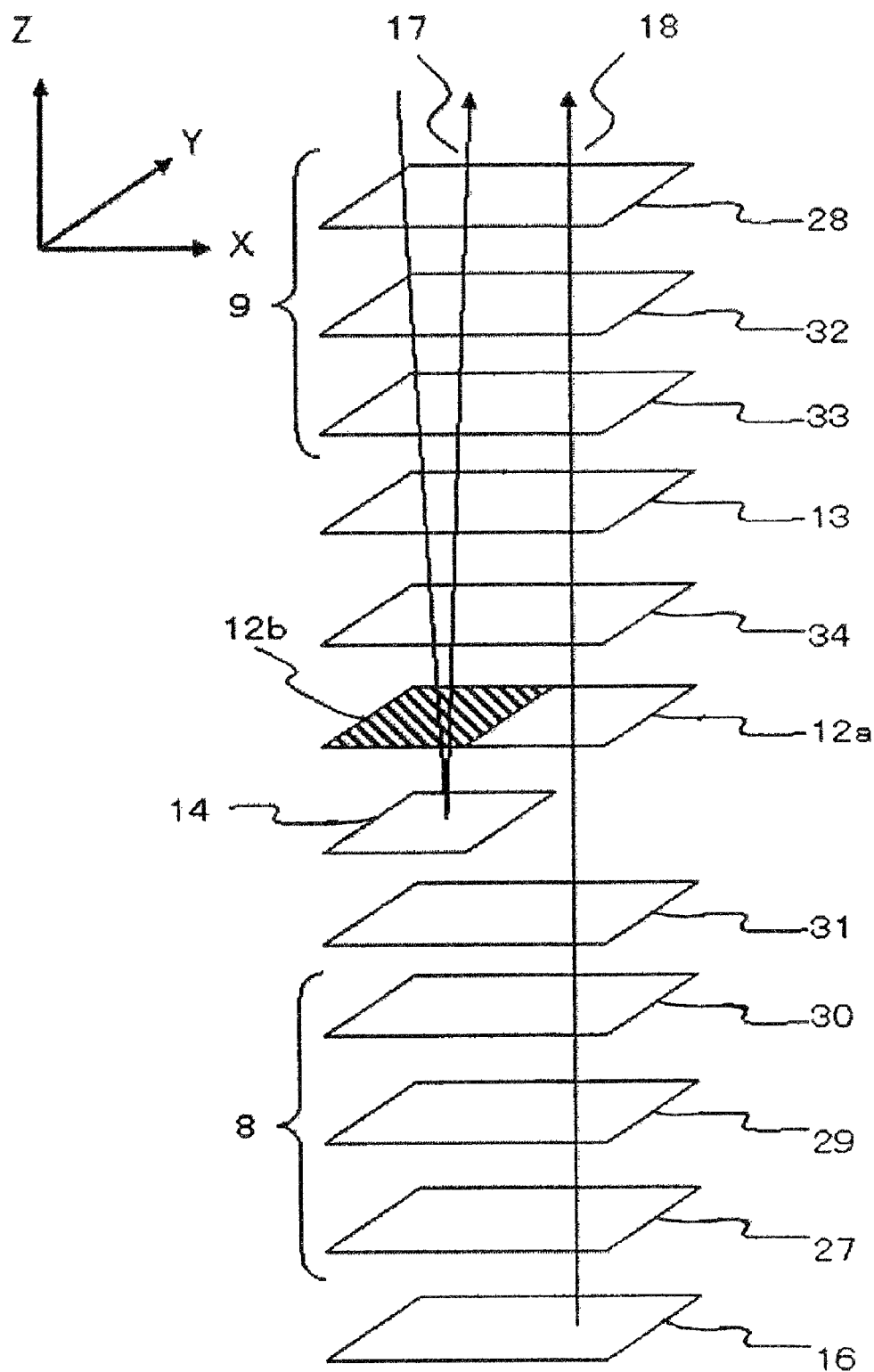
FIG. 12 is a schematic exploded perspective view showing a structure of a liquid crystal display device with a touch panel according to Example 2-2.

A liquid crystal display device with a touch panel according to Example 2-2 will be described in specific detail below. FIG. 12 is a schematic exploded perspective view showing a structure of a liquid crystal display device with a touch panel according to Example 2-2. According to Example 2-2, back-side circular polarizer 8 comprises polarizer 27, half-wave plate 29 (Nz=0), and quarter-wave plate 30 (Nz=1), and observer-side circular polarizer 9 comprises polarizer 28, half-wave plate 32 (Nz=1), and quarter-wave plate 33 (Nz 25=0). Though the operation of the liquid crystal display device according to Example 2-2 and the operation of the liquid crystal display device according to Example 2-1 are essentially the same as each other, they slightly differ from each other with respect to the field-of-view angle characteristics of the reflective display region.

A stacked assembly of quarter-wave plate 30 and quarter-wave plate 33 is nearly isotropic with respect to not only light parallel to the Z-axis direction but also light from oblique directions. Similarly, a stacked assembly of half-wave plate 29 and half-wave plate 32 is nearly isotropic with respect to light from the Z-axis direction and light from oblique directions. Therefore, the field-of-view angle characteristics of the contrast ratio in the transmissive display region are the same as those according to Example 2-1.

Observer-side circular polarizer 9 according to Example 2-2 has a stronger field-of-view-angle dependency than the circular polarizer according to Example 2-1. Therefore, unlike Example 2-1, the field-of-view angle characteristics of the contrast ratio in the reflective display region are not increased.

Figure 13:
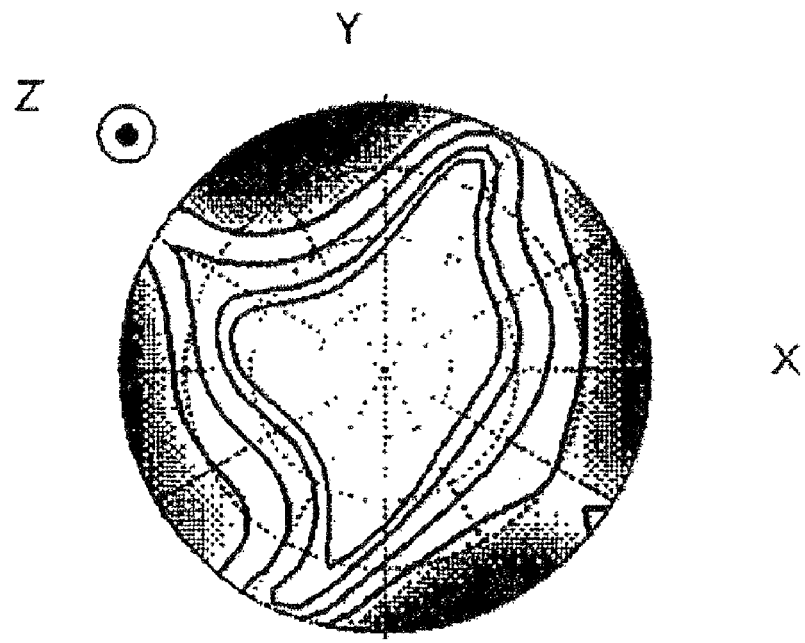
FIG. 13 is an equal-contrast diagram showing field-of-view angle characteristics of a transmissive display region of the liquid crystal display device with the touch panel according to Example 2-2.
Figure 14:
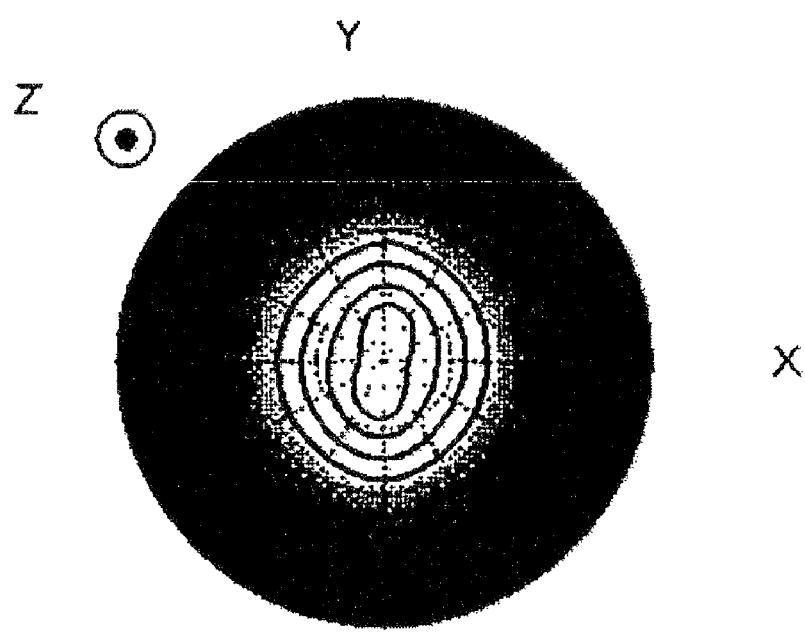
FIG. 14 is an equal-contrast diagram showing field-of-view angle characteristics of a reflective display region of the liquid crystal display device with the touch panel according to Example 2-2.

FIGS. 13 and 14 are equal-contrast diagram showing field-of-view angle characteristics of the transmissive and reflective display regions of the liquid crystal display device with the touch panel according to Example 2-2. The field-of-view angle characteristics were evaluated in the same manner as with Example 2-1. The contrast values represented by the equal contrast lines are defined in the same manner as described above with reference to FIGS. 10 and 11.

In Example 2-2, it is assumed that the wave plates with Nz=1 and the wave plates with Nz=0 have the same wavelength dispersion. Actually, as the wave plates with Nz=1 and the wave plates with Nz=0 are made of different materials, their wavelength dispersions may possibly be different from each other. If the wavelength dispersions are different from each other, then the frontal contrast ratio in the transmissive display region is lowered.

Comparative Example 1

Figure 15:
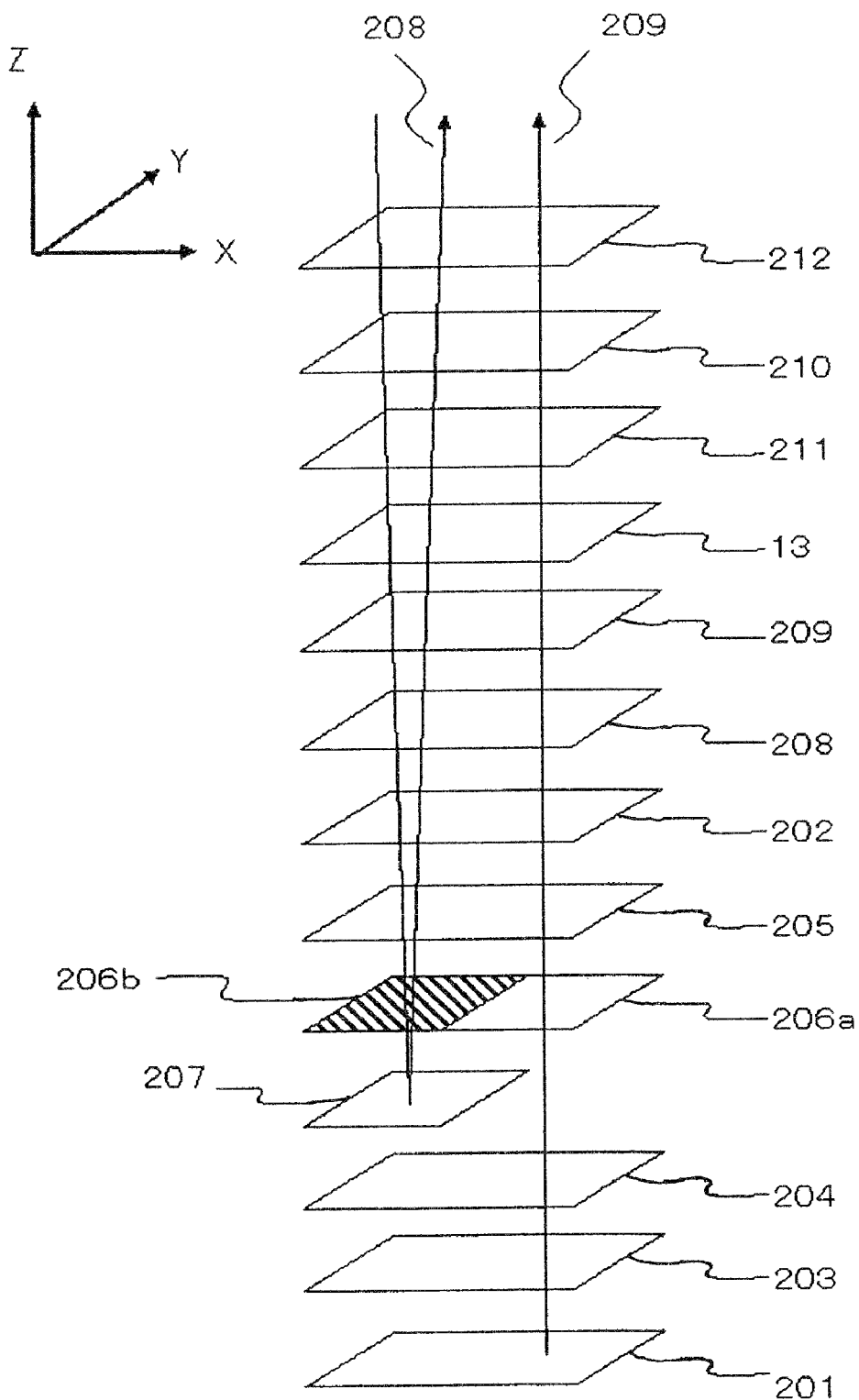
FIG. 15 is a schematic exploded perspective view showing a structure of a liquid crystal display device with a touch panel according to Comparative Example 1.

A first Comparative Example will be described below. FIG. 15 is a schematic exploded perspective view showing a structure of a liquid crystal display device with a touch panel which is based on a combination of Patent Document 1 and Patent Document 2. Each of the circular polarizers is of the double phase retarder design.

If the transmissive display region of the liquid crystal display device according to the present Comparative Example is viewed from the display screen, then it comprises polarizer 212 (placement angle: 90 degrees), half-wave plate 210 (Nz=1, placement angle: 100 degrees), quarter-wave plate 211 (Nz=1, placement angle: 155 degrees), touch panel 13, quarter-wave plate 209 (Nz=1, placement angle: 65 degrees), half-wave plate 208 (Nz=1, placement angle: 10 degrees), polarizer 202 (placement angle: 90 degrees), half-wave plate 205 (Nz=1, placement angle: 15 degrees), liquid crystal layer 206a (retardation value: 233.8 nm, placement angle: 75 degrees), phase retarder 204 (Nz=0, retardation value: 233.8 nm, placement angle: 165 degrees), half-wave plate 203 (Nz=0, placement angle: 105 degrees), and polarizer 201 (placement angle: 0 degree) which are stacked together in the order named.

If the reflective display region of the liquid crystal display device according to the present Comparative Example is viewed from the display screen, then it comprises polarizer 212 (placement angle: 90 degrees), half-wave plate 210 (Nz=1, placement angle: 100 degrees), quarter-wave plate 211 (Nz=1, placement angle: 155 degrees), touch panel 13, quarter-wave plate 209 (Nz=1, placement angle: 65 degrees), half-wave plate 208 (Nz=1, placement angle: 10 degrees), polarizer 202 (placement angle: 90 degrees), half-wave plate 205 (Nz=1, placement angle: 15 degrees), liquid crystal layer 206b (retardation value: 137.5 nm, placement angle: 75 degrees), and reflector 207 which are stacked together in the order named.

Both liquid crystal layers 206a, 206b are energized according to the lateral electric field mode. The direction of the electric field extends at −75 degrees with respect to the orientation axis of liquid crystal layers 206a, 206b.

Figure 16:
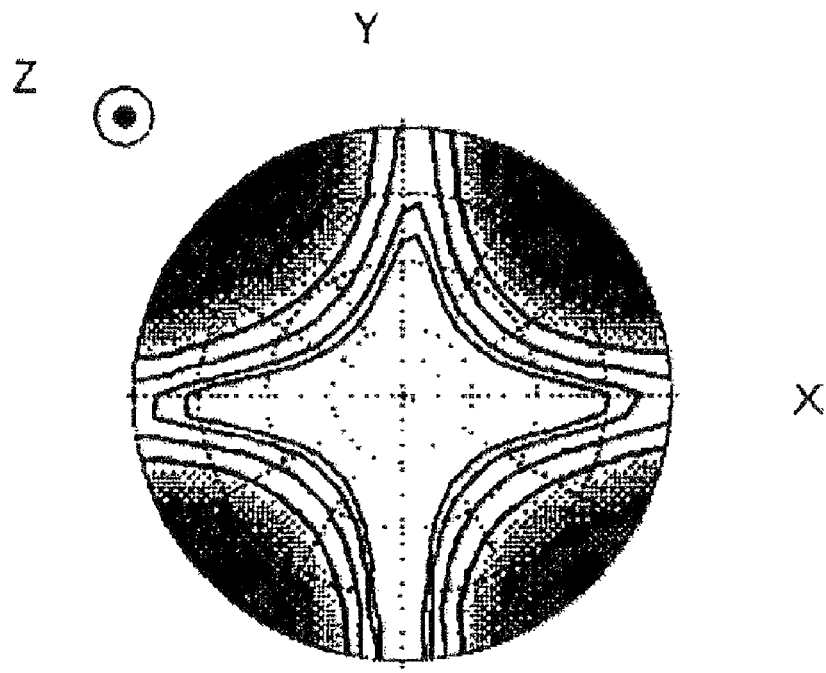
FIG. 16 is an equal-contrast diagram showing field-of-view angle characteristics of a transmissive display region of the liquid crystal display device with the touch panel according to Comparative Example 1.
Figure 17:
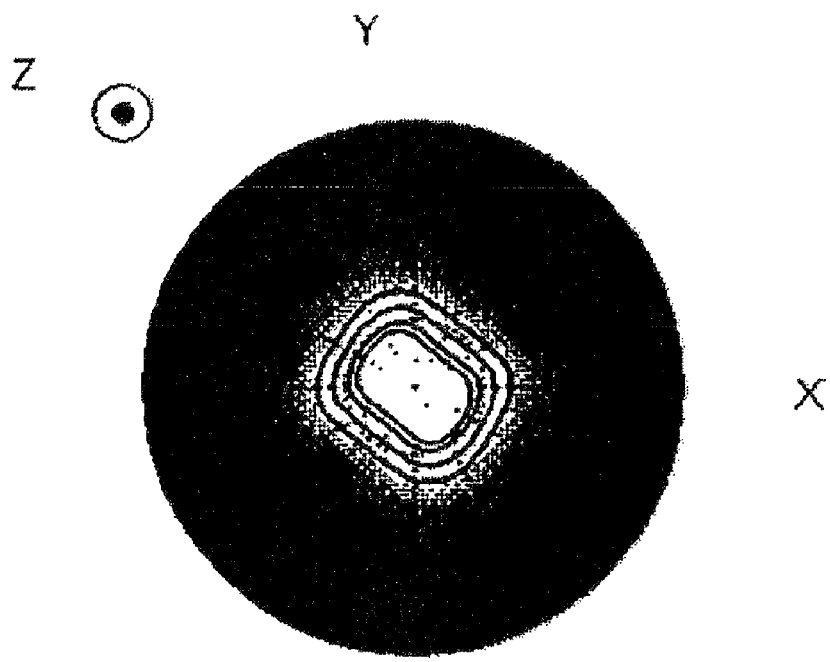
FIG. 17 is an equal-contrast diagram showing field-of-view angle characteristics of a reflective display region of the liquid crystal display device with the touch panel according to Comparative Example 1.

FIGS. 16 and 17 are equal-contrast diagrams showing field-of-view angle characteristics of transmissive and reflective display region of the liquid crystal display device with the touch panel according to Comparative Example 1. The field-of-view angle characteristics were evaluated in the same manner as with Example 2-1. The contrast values represented by the equal contrast lines are defined in the same manner as described above with reference to FIGS. 10 and 11.

A comparison between the equal contrast diagrams (FIGS. 10 and 13) of Examples 2-1, 2-2 and the equal contrast diagram (FIG. 16) of Comparative Example 1 indicates that the field-of-view angles of both Examples 2-1, 2-2 are greater than the field-of-view angle of Comparative Example 1. A comparison between the equal contrast diagrams (FIGS. 11, 14, and 17) for the reflective display regions indicates that Example 2-1 has a wide field-of-view angle.

The liquid crystal display device according to each of Examples 2-1, 2-2 comprises two polarizers and six phase retarders, whereas the liquid crystal display device according to Comparative Example 1 comprises three polarizers and seven phase retarders. Therefore, the liquid crystal display device according to each of Examples 2-1, 2-2 is one polarizer and one phase retarder less than, and hence smaller in cost and thickness than, the liquid crystal display device according to Comparative Example 1.

While each of the circular polarizers according to Examples 2-1, 2-2 and Comparative Example 1 is of the double phase retarder design, it may be of the single phase retarder design.

Exemplary Embodiment 3

Figure 18:
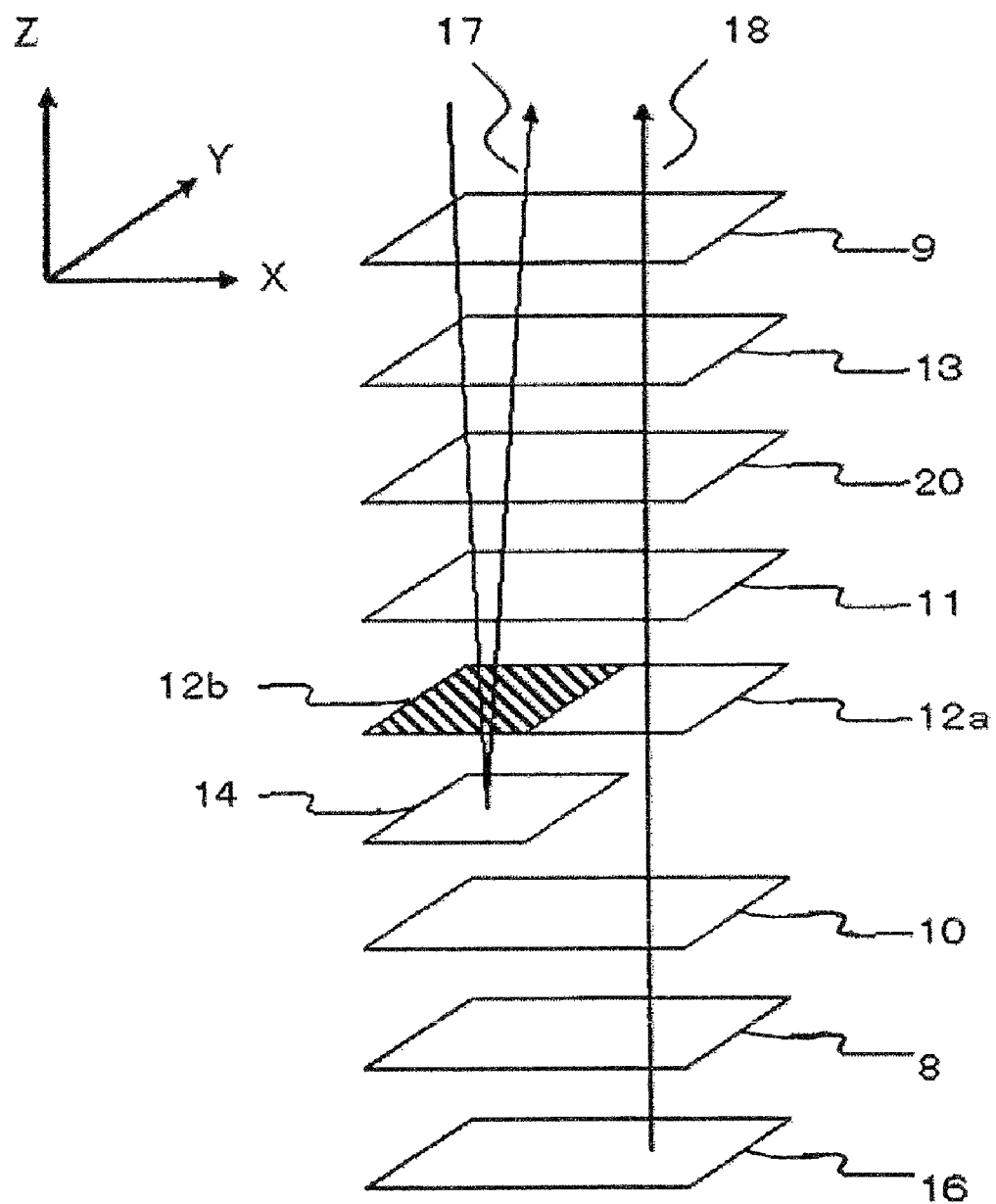
FIG. 18 is a schematic exploded perspective view showing a structure of a liquid crystal display device with a touch panel according to Exemplary Embodiment 3.

A liquid crystal display device with a touch panel according to Exemplary Embodiment 3 will be described below. The liquid crystal display device with the touch panel according to Exemplary Embodiment 3 is characterized in that a touch panel compensator for reducing a retardation produced in the touch panel is disposed between the touch panel and the observer-side compensator. The liquid crystal display device with the touch panel according to Exemplary Embodiment 3 will be described in specific detail with reference to FIG. 18.

The transmissive display region will be described below. Light emitted from backlight 16 and passing successively through back-side circular polarizer 8, back-side compensator 10, liquid crystal layer 12*a*, and observer-side compensator 11 has its polarized state changed when the light passes through touch panel compensator 20. The polarized state of the light is changed when the light passes through the touch panel 13, going back nearly to the polarized state immediately after the light has passed through observer-side compensator 11.

The reflective display region will be described below. Light applied from the observer side to observer-side circular polarizer 9 is circularly polarized thereby, and has its polarized state changed when the light passes through touch panel 13. The polarized state of the light emitted from touch panel 13 is changed when the light passes through touch panel compensator 20, going back nearly to the polarized state immediately after the light has passed through observer-side circular polarizer 9. Then, the light passing through observer-side compensator 11, liquid crystal layer 12*b*, reflector 14, liquid crystal layer 12*b*, and observer-side compensator 11 has its polarized state changed when the light passes through touch panel compensator 20. When the light passes through touch panel 13, the polarized state of the light goes back nearly to the polarized state before the light is applied to touch panel compensator 20.

Therefore, even if the transparent substrate of touch panel 13 has a retardation, the retardation is reduced by touch panel compensator 20, so that the contrast values in the transmissive display region and the reflective display region are prevented from being lowered. Specifically, the retardation of the transparent substrate of touch panel 13 should preferably be canceled by the retardation of touch panel compensator 20.

The phase retarder of back-side circular polarizer 8 may cancel the refractive index anisotropy of the phase retarder of observer-side circular polarizer 9.

The liquid crystal display device with each circular polarizer being of the single phase retarder design will be described below. Observer-side circular polarizer 9 comprises an observer-side phase retarder, observer-side compensator 11, liquid crystal layer 12*a* in the transmissive display region and backside compensator 10. Back-side circular polarizer 8 comprises a back-side phase retarder. In the stacked assembly of the observer-side phase retarder, observer-side compensator 11, liquid crystal layer 12*a*, back-side compensator 10 and the back-side phase retarder, observer-side compensator 11, liquid crystal layer 12*a* and back-side compensator 10 are optically isotropic or nearly isotropic. Therefore, the stacked assembly can be regarded as the stacked assembly of the observer-side phase retarder and the back-side phase retarder. As the stacked assembly of the observer-side phase retarder and the back-side phase retarder is isotropic or nearly isotropic, the phase between the observer-side polarizer of observer-side circular polarizer 9 and the back-side polarizer of back-side circular polarizer 8 is optically isotropic or nearly isotropic. This state has its field-of-view angle characteristics determined by the performance of the polarizers, and when this state is used to display black, the contrast ratio at the time the liquid crystal display device is obliquely viewed is increased.

The liquid crystal display device with each circular polarizer being of the double phase retarder design will be described below. Back-side circular polarizer 8 comprises a first back-side phase retarder and a second back-side phase retarder. The first back-side phase retarder is disposed in a position closer to the liquid crystal layer than the second back-side phase retarder, Observer-side circular polarizer 9 comprises a first observer-side phase retarder and a second observer-side phase retarder. The first observer-side phase retarder is disposed in a position closer to the liquid crystal layer than the second observer-side phase retarder. In the stacked assembly of the second observer-side phase retarder, the first observer-side phase retarder, observer-side compensator 11, liquid crystal layer 12*a*, back-side compensator 10, the first back-side phase retarder, and the second back-side phase retarder, the refractive index anisotropy of the first back-side phase retarder is canceled by the first observer-side phase retarder, and the refractive index anisotropy of the second back-side phase retarder is canceled by the second observer-side phase retarder. Therefore, the phase between the back-side polarizer and the observer-side polarizer is to be optically isotropic or nearly isotropic by cancellation of the anisotropy. When this state is used to display black, the contrast ratio at the time the liquid crystal display device is obliquely viewed is increased.

All of the phase retarder of back-side circular polarizer 8 and the phase retarder of observer-side circular polarizer 9 may have an Nz coefficient of about 0.5.

The liquid crystal display device with each circular polarizer being of the single phase retarder design will be described below. When the observer-side phase retarder of observer-side circular polarizer 9 has an Nz coefficient of about 0.5, observer-side circular polarizer 9 gives a retardation close to the retardation with respect to light parallel to the normal line of the observer-side phase retarder, to light inclined the angle θ to the normal line. The range of the angle θ is wide. Observer-side circular polarizer 9 thus function as a wideband circular polarizer, increasing the field-of-view angle characteristics of the contrast ratio in the reflective display region. The phase retarder of observer-side circular polarizer 9 and the phase retarder of back-side circular polarizer 8 may comprise the same phase retarder. Therefore, there is no different wavelength dispersion due to different materials of the paired phase retarders, and the retardations are sufficiently canceled out to prevent the contrast ratio in the transmissive display region from being lowered.

The liquid crystal display device with each circular polarizer being of the double phase retarder design will be described below. With the double phase retarder design, if the phase retarders of the respective circular polarizers have an Nz coefficient of about 0.5, the phase retarders give a retardation close to the retardation with respect to light parallel to the normal line to light inclined the angle θ to the normal line. The range of the angle θ is wide. Therefore, the field-of-view angle characteristics of the contrast ratio in the reflective display region are improved. Since the paired phase retarders may comprise the same phase retarder, the contrast ratio in the transmissive display region is prevented from being lowered due to different wavelength dispersions of the refractive indexes.

Example 3

Figure 19:
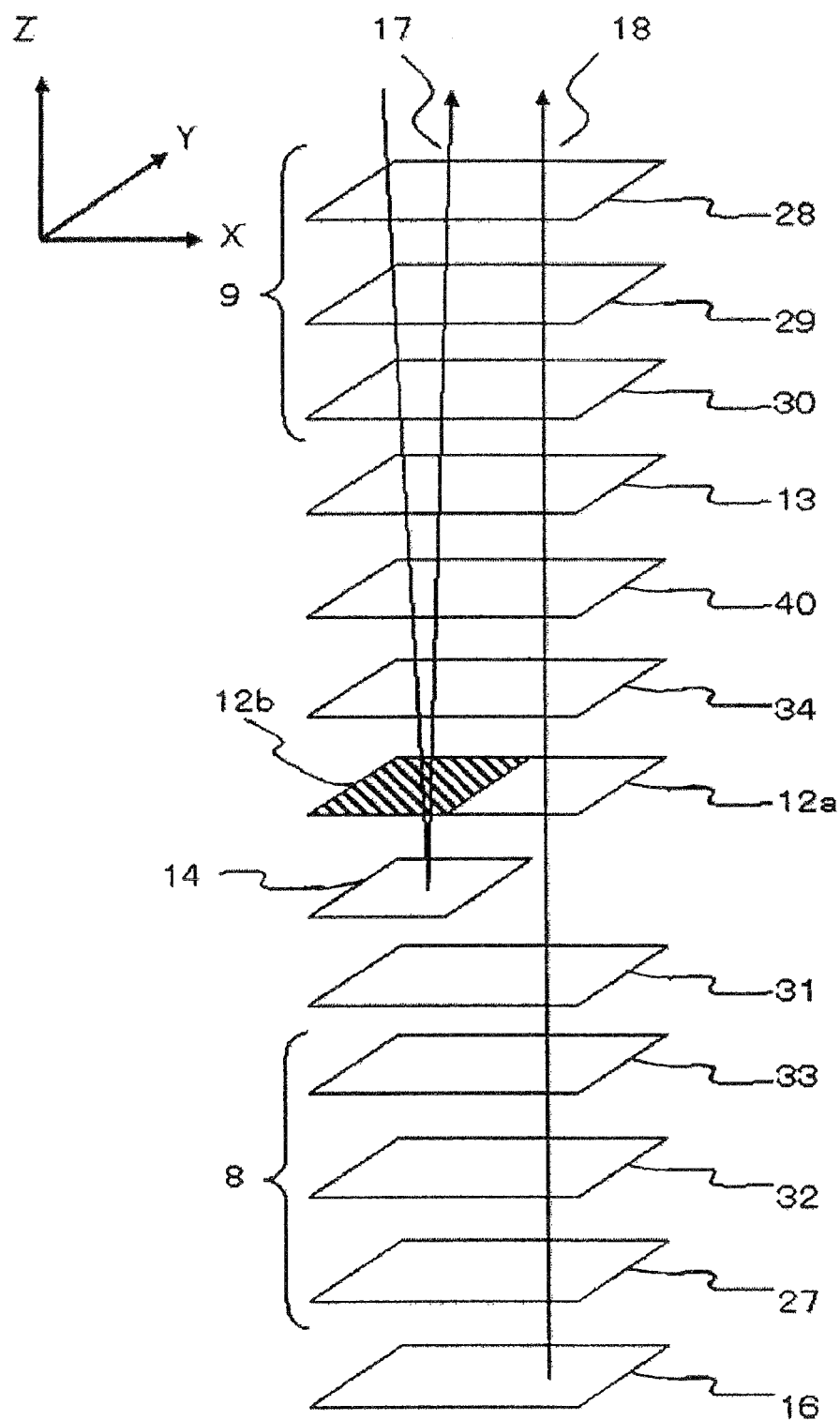
FIG. 19 is a schematic exploded perspective view showing a structure of a liquid crystal display device with a touch panel according to Example 3.

A liquid crystal display device with a touch panel according to Example 3 will be described in specific detail below. FIG. 19 is a schematic exploded perspective view showing a structure of a liquid crystal display device with a touch panel according to Example 3.

In Example 3, circular polarizer is of the double phase retarder design. The transparent substrate (not shown) of touch panel 13 has a retardation. Touch panel 13 as a whole has an Nz coefficient of 1 and a retardation value of 50 nm. The placement angle of touch panel 13 is 90 degrees.

If the transmissive display region of the liquid crystal display device according to the present Example is viewed from the display screen, then it comprises polarizer 28 (placement angle: 90 degrees), half-wave plate 29 (Nz=0, placement angle: 100 degrees), quarter-wave plate 30 (Nz=1, placement angle: 155 degrees), touch panel 13 (Nz=1, retardation value: 50 nm, placement angle: 90 degrees), 50 nm phase retarder 40 (Nz=0, placement angle: 0 degree), quarter-wave plate 34 (Nz=0, placement angle: 90 degrees), liquid crystal layer 12a (retardation value: 275 nm, placement angle: 0 degree), quarter-wave plate 31 (Nz=0, placement angle: 90 degrees), quarter-wave plate 33 (Nz=0, placement angle: 65 degrees), half-wave plate 32 (Nz=1, placement angle: 10 degrees), and polarizer 27 (placement angle: 0 degree) which are stacked together in the order named.

If the reflective display region of the liquid crystal display device according to the present Example is viewed from the display screen, then it comprises polarizer 28 (placement angle: 90 degrees), half-wave plate 29 (Nz=0, placement angle: 100 degrees), quarter-wave plate 30 (Nz=1, placement angle: 155 degrees), touch panel 13 (Nz=1, retardation value: 50 nm, placement angle: 90 degrees), 50 nm phase retarder 40 (Nz=0, placement angle: 0 degree), quarter-wave plate 34 (Nz=0, placement angle: 90 degrees), liquid crystal layer 12b (retardation value: 137.5 nm, placement angle: 0 degree), and reflector 14 which are stacked together in the order named.

Both liquid crystal layers 12a, 12b are energized according to the lateral electric field mode. The electric field is directed at an angle of −75 degrees with respect to the orientation axis of liquid crystal layers 12a, 12b.

Touch panel 13 and 50 nm phase retarder 40 cancel out their retardations. In other words, touch panel 13 and 50 nm phase retarder 40 are nearly isotropic. The transmissive display region of the liquid crystal display device according to the present Example thus operates and has field-of-view angle characteristics of the contrast ration in the same manner as with Example 2-1, etc.

Exemplary Embodiment 4

Figure 20:
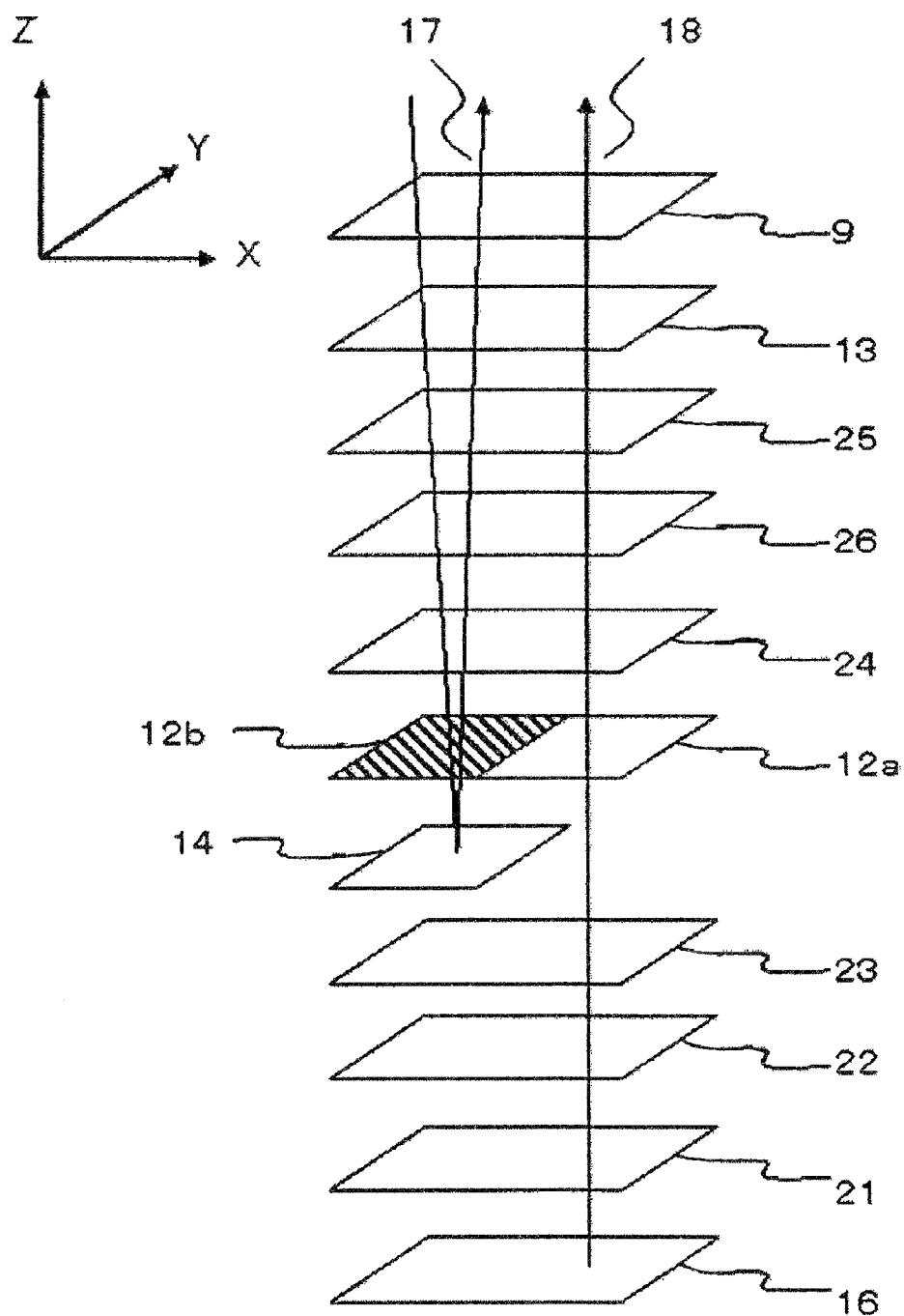
FIG. 20 is a schematic exploded perspective view showing a structure of a liquid crystal display device with a touch panel according to Exemplary Embodiment 4.

A liquid crystal display device with a touch panel according to Exemplary Embodiment 4 will be described below. The liquid crystal display device with the touch panel according to Exemplary Embodiment 4 will be described in specific detail with reference to FIG. 20. The liquid crystal display device with the touch panel according to Exemplary Embodiment 4 includes a first substrate and a second substrate, not shown, and liquid crystal layers 12a, 12b sandwiched between these substrates. A reflective display region and a transmissive display region are provided in a pixel region. A voltage is applied parallel to the surfaces of the substrates to at least liquid crystal layer 12a in the transmissive display region. At least liquid crystal layer 12a in the trans-missive display region is energized according to the lateral electric field mode.

First phase retarder 24 with an Nz coefficient of about 0.5 is disposed on the side of the first substrate remote from liquid crystal layers 12a, 12b. Second phase retarder 23 with an Nz coefficient of about 0 and third phase retarder 22 with an Nz coefficient of about 0.5 are disposed on the side of the second substrate remote from liquid crystal layers 12a, 12b.

The retarder axis of first phase retarder 24 and the retarder axis of third phase retarder 22 are substantially perpendicular to each other. The retardation of first phase retarder 24 and the retardation of third phase retarder 22 are substantially equal to each other. The retarder axis of second phase retarder 23 and the orientation axis of liquid crystal layer 12a in the transmissive display region are substantially perpendicular to each other. The retardation of second phase retarder 23 and the retardation of liquid crystal layer 12a are substantially equal to each other.

Fourth phase retarder 25 and intermediate polarizer 26 for converting circularly polarized light that has passed through touch panel 13 and observer-side circular polarizer 9 back into linearly polarized light are disposed between observer-side circular polarizer 9 and first phase retarder 24. Back-side polarizer 21 is disposed between backlight 16 and third phase retarder 22.

Display operation of the liquid crystal display device with the touch panel according to the present Exemplary Embodiment will be described below. For the sake of brevity, it is assumed that light which passes through touch panel 13 has its polarized state unchanged.

The retardation of first phase retarder 24 with respect to light parallel to the normal line of the film surface is defined as Re1(0). The retardation of second phase retarder 23 with respect to light parallel to the normal line of the film surface is defined as Re2(0). The retardation of third phase retarder 22 with respect to light parallel to the normal line of the film surface is defined as Re3(0). The retardation with respect to light parallel to the normal to horizontally oriented liquid crystal layer 12a at the time no voltage is applied to liquid crystal layer 12a is defined as ReLC(0).

In the reflective display region, outside light that has passed through observer-side circular polarizer 9 is converted into circularly polarized light. The circularly polarized light passes through touch panel 13 and is converted into linearly polarized light by fourth phase retarder 25. The light can effectively be utilized by aligning the transmission axis of the linearly polarized light and the transmission axis of intermediate polarizer 26 with each other. When liquid crystal layer 12b is not in operation, intermediate polarizer 26, first phase retarder 24, and liquid crystal layer 12b in the reflective display region jointly make up a circular polarizer. Therefore, light that has passed through intermediate polarizer 26, first phase retarder 24, and liquid crystal layer 12a becomes right-handed circularly polarized light, for example, that reaches reflector 14. Whether the circularly polarized light is right-handed or left-handed depends on the placement angles of phase retarder 24 and liquid crystal layer 12b. The light that is applied to reflector 14 is converted into left-handed circularly polarized light when it is reflected by reflector 14. The converted light is applied to the circular polarizer made up of liquid crystal layer 12b in the reflective display region, first phase retarder 24, and intermediate polarizer 26. Though the circular polarizer passes right-handed circularly polarized light, it absorbs left-handed circularly polarized light. Therefore, no light is emitted from the circular polarizer, displaying black. In other words, the reflective display region displays black when liquid crystal layer 12b is not in operation. First phase retarder 24 has an Nz coefficient of about 0.5. Consequently, first phase retarder 24 gives a retardation close to the retardation with respect to light parallel to the normal line to light inclined to the normal line. Accordingly, the angular range through which light to be converted into circularly polarized light by the circular polarizer is applied to the circular polarizer is wider than if a phase retarder with an Nz coefficient of 1 or 0 is used. As a result, the field-of-view angle characteristics in the reflective display region are better than those of the liquid crystal display devices of the related art.

If the stacked assembly of the phase retarder of observer-side circular polarizer 9 and fourth phase retarder 25 for converting the circularly polarized light that has passed through observer-side circular polarizer 9 back into linearly polarized light is nearly isotropic, then the field-of-view angle characteristics of the contrast ratio are better.

Optical operation of the transmissive display region at the time liquid crystal layer 12a is not in operation will be described below. The retarder axis of second phase retarder 23 and the orientation axis of liquid crystal layer 12a are substantially perpendicular to each other, and the retardation of second phase retarder 23 and the retardation of liquid crystal layer 12a are substantially equal to each other. Therefore, the stacked assembly of second phase retarder 23 and liquid crystal layer 12a cancel out the retardations. In other words, the stacked assembly becomes optically isotropic with respect to light parallel to the Z-axis by cancellation of the retardation. Second phase retarder 23 has an Nz coefficient of about 0, and horizontally oriented liquid crystal layer 12a has an Nz coefficient of 1. Therefore, the stacked assembly of second phase retarder 23 and liquid crystal layer 12a cancels out oblique retardations at between second phase retarder 23 and liquid crystal layer 12a. In other words, the stacked assembly also becomes nearly optically isotropic with respect to light that is obliquely applied by cancellation of the retardation. The stacked assembly of first phase retarder 24, liquid crystal layer 12a, second phase retarder 23, and third phase retarder 22 can be retarded as a stacked assembly of first phase retarder 24 and third phase retarder 22 because the stacked assembly of liquid crystal layer 12a and second phase retarder 23 is isotropic or nearly isotropic.

The retarder axis of first phase retarder 24 and the retarder axis of third phase retarder 22 are substantially perpendicular to each other, and the retardation of first phase retarder 24 and the retardation of third phase retarder 22 are substantially equal to each other. Therefore, the stacked assembly of first phase retarder 24 and third phase retarder 22 is optically isotropic with respect to light parallel to the Z-axis. Since first phase retarder 24 and third phase retarder 22 have an Nz coefficient of about 0.5, they give a retardation, which is close to the retardation with respect to light parallel to the Z-axis, with respect to light inclined to the Z-axis directions in a wide range. Therefore, the retardation with respect to light inclined to the normal is also canceled. Accordingly, the stacked assembly of first phase retarder 24, liquid crystal layer 12a, second phase retarder 23, and third phase retarder 22 is nearly isotropic with respect to light parallel to the normal line and light inclined to the normal line.

Since the transmission axis of intermediate polarizer 26 and the trans-mission axis of back-side polarizer 21 are substantially perpendicular to each other, light emitted from backlight 16 does not pass through intermediate polarizer 26, displaying black. In other words, while liquid crystal layer 12a is not in operation, the transmissive display region displays black as with the reflective display region. As the stacked assembly of first phase retarder 24, liquid crystal layer 12a, second phase retarder 23, and third phase retarder 22 is nearly isotropic, the field-of-view angle characteristics of the contrast ratio in the transmissive display region are improved in a wide range.

Optical operation at the time a voltage is applied to liquid crystal layers 12a, 12b will be described below. When a voltage is applied to liquid crystal layers 12a, 12b, the oriented states of liquid crystal layers 12a, 12b in the transmissive display region and the reflective display region are deformed, changing the refractive index anisotropy. In the reflective display region, intermediate polarizer 26, first phase retarder 24, and liquid crystal layer 12b jointly make up a circular polarizer. When the refractive index anisotropy of liquid crystal layer 12b is changed by the applied voltage, the polarized state of the applied circularly polarized light is changed. This change differs depending on the applied voltage and the thickness of liquid crystal layer 12b. It is possible to control the polarized state such that outside light which has passed through intermediate polarizer 26 is reflected by the reflector 14 and passes again through intermediate polarizer 26. While liquid crystal layer 12b is in operation, the reflective display region displays white.

Optical operation of the transmissive display region when a voltage is applied to liquid crystal layer 12a will be described below. When the refractive index anisotropy of liquid crystal layer 12a is changed by the applied voltage, the phase between second phase retarder 23 and liquid crystal layer 12a becomes not optically isotropic. Therefore, the four layers including third phase retarder 22, second phase retarder 23, liquid crystal layer 12a, and first phase retarder 24 are not optically isotropic, allowing the light emitted from backlight 16 to pass through intermediate polarizer 26. Therefore, the transmissive display region displays white.

In this manner, a semitransmissive liquid crystal display device of a normally black mode whose transmissive display region and reflective display region are energized according to the lateral electric field mode is realized.

The side of back-side polarizer 21 may be used as a display screen. In this case, the transmissive display region as viewed from the display screen comprises observer-side circular polarizer 9, touch panel 13, fourth phase retarder 25, back-side polarizer 21, third phase retarder 22, second phase retarder 23, liquid crystal layer 12a, first phase retarder 24, and intermediate polarizer 26 which are stacked together in the order named.

The reflective display region as viewed from the display screen comprises observer-side circular polarizer 9, touch panel 13, fourth phase retarder 25, back-side polarizer 21, third phase retarder 22, second phase retarder 23, liquid crystal layer 12b, and reflector 14 which are stacked together in the order named. Back-side polarizer 21, third phase retarder 22, second phase retarder 23, and liquid crystal layer 12b make up a wide-band circular polarizer for increasing the contrast ratio of the reflective display region.

The single phase retarder design of the related art requires three polarizers and five phase retarders of four types, and the double phrase retarder design of the related art requires three polarizers and seven phase retarders of four types. The liquid crystal display device with the touch panel according to the present Exemplary Embodiment allows the same phase retarder to be used as first phase retarder 24 and third phase retarder 22. Therefore, the single phase retarder design may comprise three polarizers and five phase retarders of three types, and the double phase retarder design may comprise three polarizers and seven phase retarders of three types. Therefore, the number of types of phase retarders that are required is reduced, resulting in a reduction in the cost. Since the same phase retarder is used as first phase retarder 24 and third phase retarder 22, the wavelength dispersions of the refractive indexes remain the same to sufficiently cancel out the retardations between first phase retarder 24 and third phase retarder 22. Consequently, the contrast ratio of the transmissive display region is not reduced unlike the liquid crystal display device of the related art.

Example 4

Figure 21:
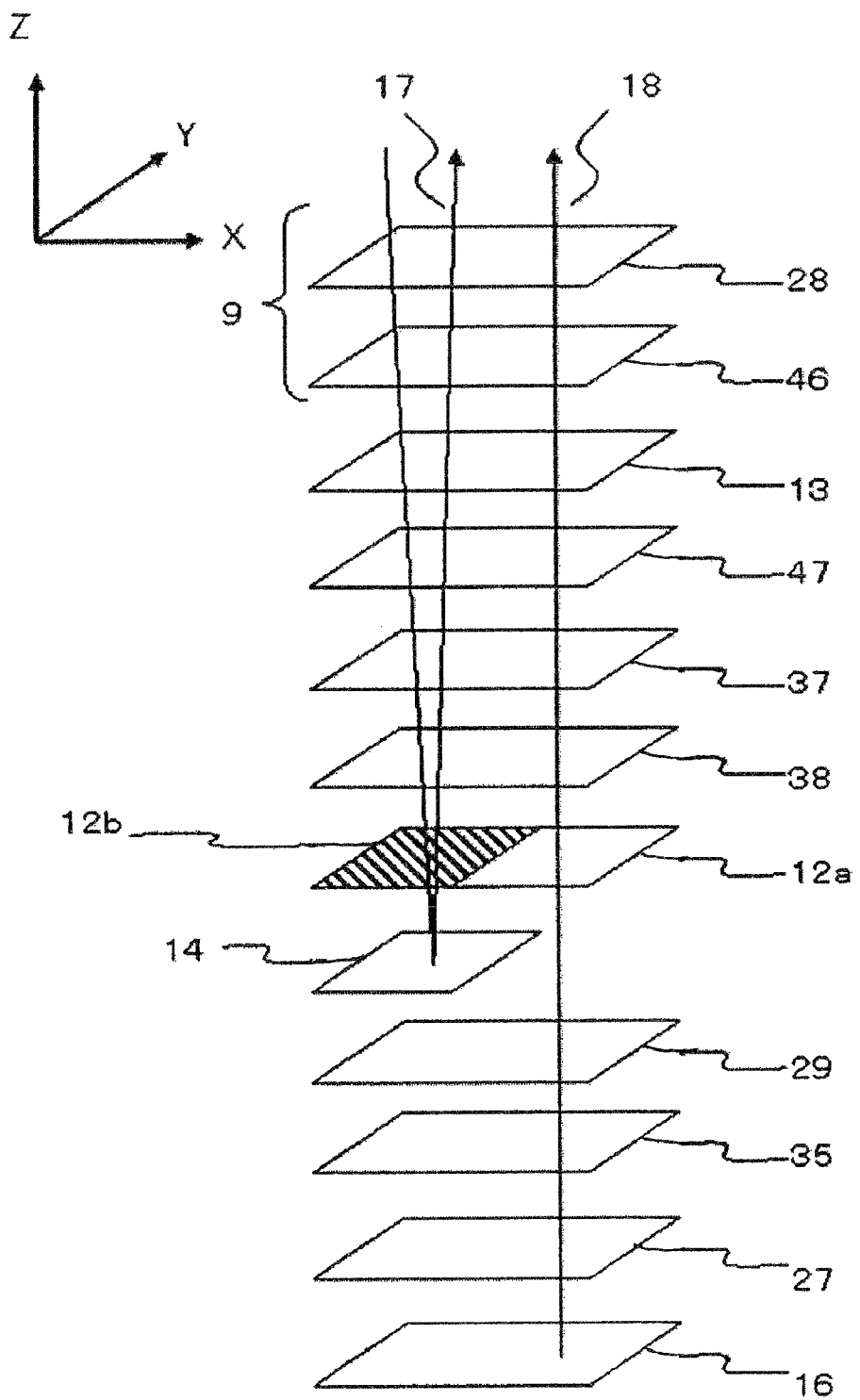
FIG. 21 is a schematic exploded perspective view showing a structure of a liquid crystal display device with a touch panel according to Example 4.

Example 4 of the liquid crystal display device with the touch panel of the related art will be described below. FIG. 21 is a schematic exploded perspective view showing a structure of a liquid crystal display device with a touch panel according to Example 4

If the transmissive display region of the liquid crystal display device with the touch panel according to Example 4 is viewed from the display screen, then it comprises polarizer 28 (placement angle: 90 degrees), reverse dispersion quarter-wave plate 46 (Nz=0.5, placement angle: 135 degrees), touch panel 13, reverse dispersion quarter-wave plate 47 (Nz=0.5, placement angle: 45 degrees), polarizer 37 (placement angle: 90 degrees), half-wave plate 38 (Nz=0.5, placement angle: 100 degrees), liquid crystal layer 12a (retardation value: 275 nm, placement angle: 155 degrees), half-wave plate 29 (Nz=0, placement angle: 65 degrees), half-wave plate 35 (Nz=0.5, placement angle: 10 degrees), and polarizer 27 (placement angle: 0 degree) which are stacked together in the order named.

If the reflective display region is viewed from the display screen, then it comprises polarizer 28 (placement angle: 90 degrees), reverse dispersion quarter-wave plate 46 (Nz=0.5, placement angle: 135 degrees), touch panel 13, reverse dispersion quarter-wave plate 47 (Nz=0.5, placement angle: 45 degrees), polarizer 37 (placement angle: 90 degrees), half-wave plate 38 (Nz=0.5, placement angle: 100 degrees), liquid crystal layer 12b (retardation value: 137.5 nm, placement angle: 0 degree), and reflector 14 which are stacked together in the order named.

Both liquid crystal layers 12a, 12b are energized according to the lateral electric field mode. The electric field is directed at an angle of −75 degrees with respect to the orientation axis of liquid crystal layers 12a, 12b.

According to the present Example, observer-side circular polarizer 9 is disposed on the observer side of touch panel 13. As a consequence, the contrast ratio is prevented from being lowered by outside light which would be reflected in touch panel 13 toward the observer.

A black display mode of the transmissive display region will be described below. The orientation axis of liquid crystal layer 12a of the transmissive display region and the retarder axis of half-wave plate 29 are substantially perpendicular to each other. Retardations Re2(0) and ReLC(0) are equal to each other (275 nm). Therefore, in the stacked assembly of liquid crystal layer 12a and half-wave plate 29, retardations with respect to light parallel to the normal line are canceled out.

Half-wave plate 29 has an Nz coefficient of 0, and horizontally oriented liquid crystal layer 12a has an Nz coefficient of 1. Therefore, retardations with respect to light inclined to the normal line are canceled out in a wide range.

The stacked assembly of half-wave plate 38, liquid crystal layer 12a, half-wave plate 29, and half-wave plate 35 can be retarded as the stacked assembly of half-wave plate 38 and half-wave plate 35 because the stacked assembly of liquid crystal layer 12a and half-wave plate 29 is isotropic. The retarder axes of half-wave plate 38 and half-wave plate 35 are substantially perpendicular to each other. Retardations Re1(0) and Re3(0) are equal to each other (275.0 nm). Therefore, retardations Re1(0) and Re3(0) with respect to light parallel to the normal line of the stacked assembly are canceled out.

Inasmuch as half-wave plates 35, 38 have an Nz coefficient of 0.5, the relationship $Re1(0)=Re3(0)\approx Re1(\theta)\approx Re3(\theta)$ is satisfied in a wide range with respect to light inclined to the normal line. Therefore, retardations with respect to light inclined to the normal line are canceled out.

Consequently, the stacked assembly of half-wave plate 38 (Nz=0.5), liquid crystal layer 12a, half-wave plate 29 (Nz=0), and half-wave plate 35 (Nz=0.5) is isotropic with respect to light in the direction of the normal line and is nearly isotropic with respect to light oblique to the direction of the normal line. Therefore, the field-of-view angle characteristics of the black display mode in the transmissive display region are essential equal to the field-of-view angle characteristics of the liquid crystal display device of the related art.

Figure 22:
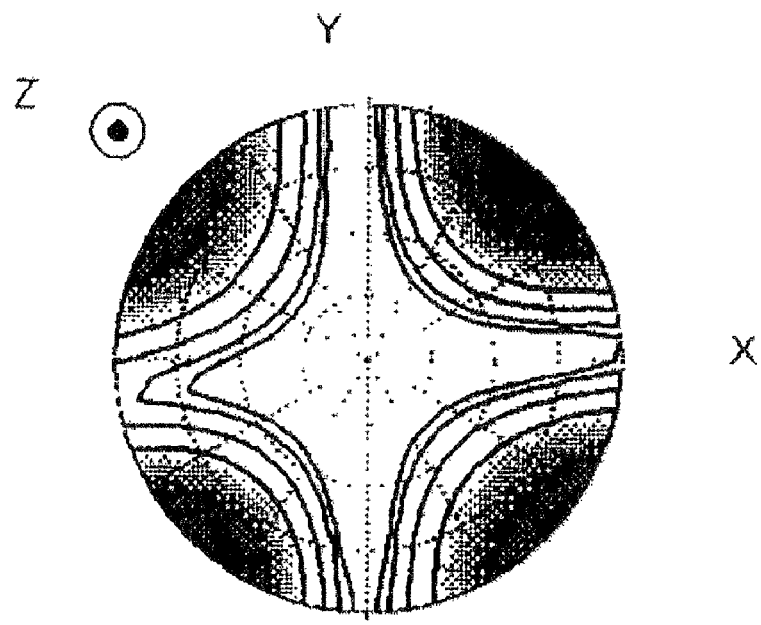
FIG. 22 is an equal-contrast diagram showing field-of-view angle characteristics of a transmissive display region of the liquid crystal display device with the touch panel according to Example 4.

FIG. 22 is an equal-contrast diagram showing field-of-view angle characteristics of the transmissive display region of the liquid crystal display device with the touch panel according to Example 4. The field-of-view angle characteristics were evaluated in the same manner as Example 2-1. The contrast values represented by the equal contrast lines are defined in the same manner as described above with reference to FIG. 10.

Since half-wave plate 38 (Nz=0.5) and half-wave plate 35 (Nz=0.5) which are paired may comprise the same phase retarder, there is no difference between the wavelength dispersions of the refractive indexes, resulting in a higher contrast value in the transmission display region than the related art.

A black display mode of the reflective display region will be described below with reference to FIG. 21. Outside light which has passed through observer-side circular polarizer 9 is converted into circularly polarized light, which then passes through touch panel 13 and is converted into linearly polarized light by reverse dispersion quarter-wave plate 47 (Nz=0.5). At this time, since the transmission axis of the linearly polarized light and the transmission axis of intermediate polarizer 26 (polarizer 37) are aligned with each other, the light can effectively be utilized.

In the reflective display region, when liquid crystal layer 12b is not in operation, polarizer 37, half-wave plate 38, and liquid crystal layer 12b make up a wide-band circular polarizer with respect to light applied along the direction of the normal line. The light that has passed through polarizer 37, half-wave plate 38, and liquid crystal layer 12b is converted into circularly polarized light, which is converted into reversely circularly polarized light when it is reflected by reflector 14. Since the reversely circularly polarized light cannot pass through the wide-band circular polarizer made up of liquid crystal layer 12b, half-wave plate 38, and polarizer 37, the reflective display region displays black. Half-wave plate 38 gives a retardation close to the retardation Re1(0) in a wide range to light inclined to the normal line. Accordingly, the angular range through which light to be converted into circularly polarized light by the circular polarizer is applied to the circular polarizer is wider than if a phase retarder with an Nz coefficient of 1 or 0 is used. As a result, the field-of-view angle characteristics in the reflective display region are better than those of the liquid crystal display devices of the related art.

Reverse dispersion quarter-wave plate 46 (Nz=0.5) of observer-side circular polarizer 9 and reverse dispersion quarter-wave plate 47 (Nz=0.5) for converting circularly polarized light that has passed through observer-side circular polarizer 9 back into linearly polarized light cancel out each other's refractive index anisotropy. Therefore, the stacked assembly of wave plates 46, 47 is nearly isotropic, further improving the field-of-view angle characteristics of the contrast ratio.

Figure 23:
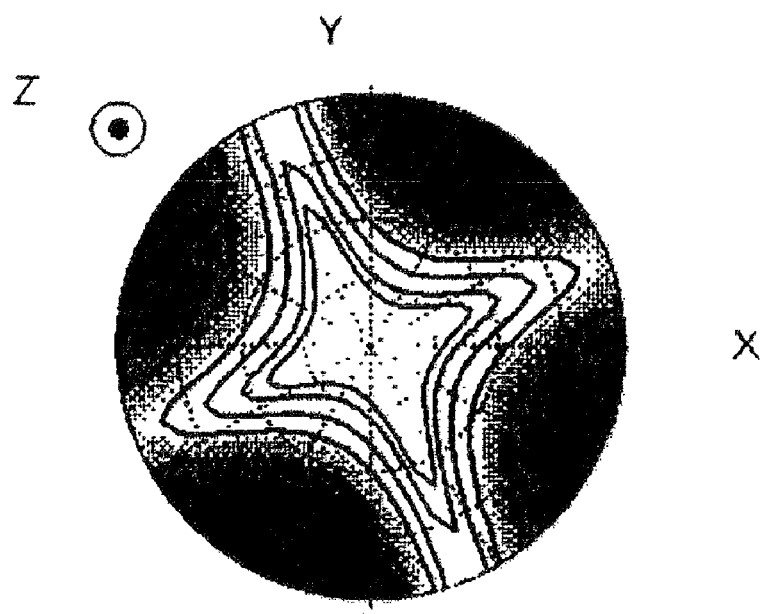
FIG. 23 is an equal-contrast diagram showing field-of-view angle characteristics of a reflective display region of the liquid crystal display device with the touch panel according to Example 4.

FIG. 23 is an equal-contrast diagram showing field-of-view angle characteristics of the reflective display region of the liquid crystal display device with the touch panel according to Example 4. The field-of-view angle characteristics were evaluated in the same manner as Example 2-1. The contrast values represented by the equal contrast lines are defined in the same manner as described above with reference to FIG. 11.

In Example 4, the retardation of liquid crystal layer 12a in the transmissive display region is represented by about a half wavelength. However, the retardation of liquid crystal layer 12a is variable. When the retardation of liquid crystal layer 12a varied, the retardation of second phase retarder 23 is also varied.

Comparative Example 2

Figure 24:
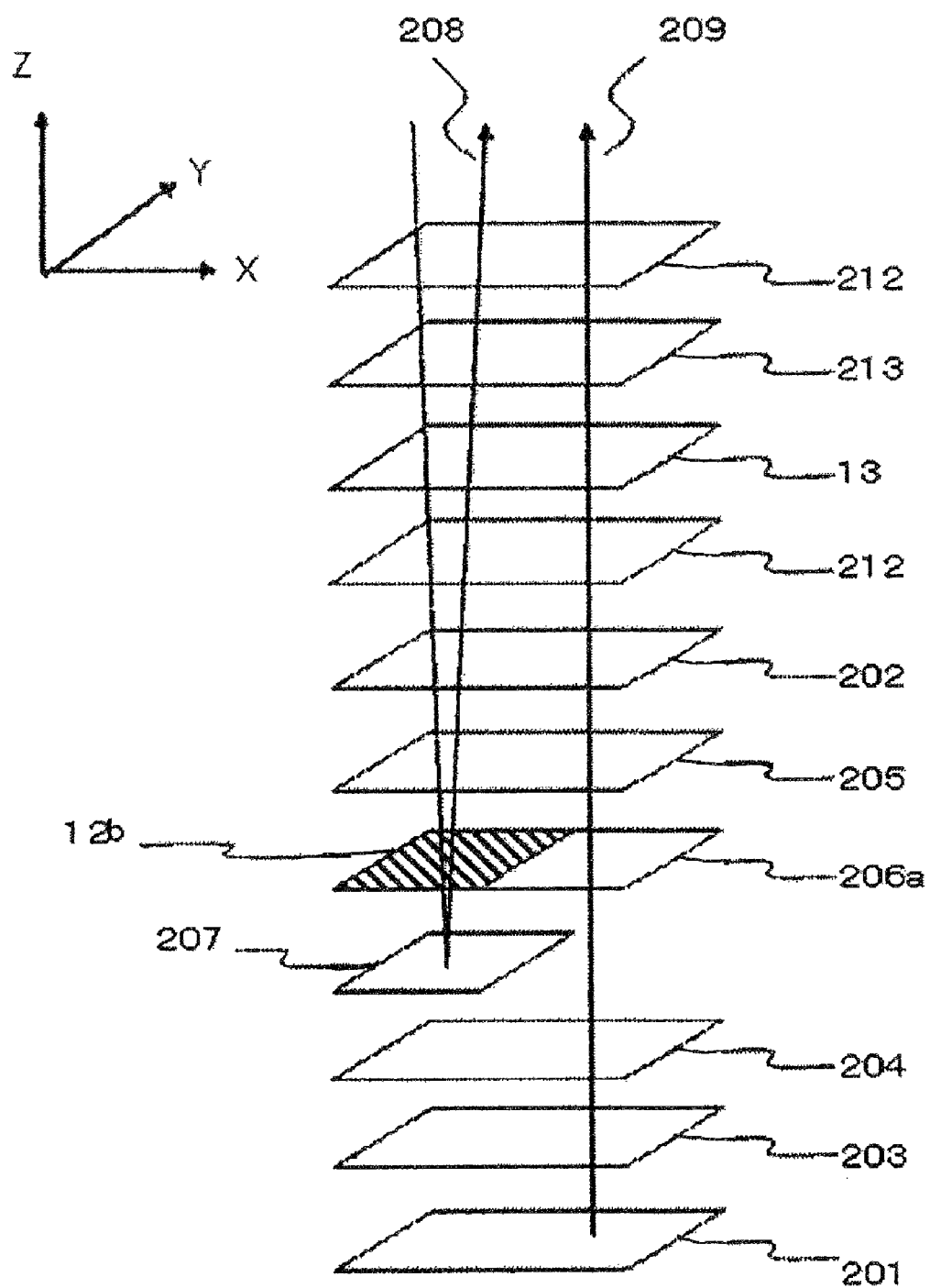
FIG. 24 is a schematic exploded perspective view showing a structure of a liquid crystal display device with a touch panel according to Comparative Example 2.

A second Comparative Example will be described below. FIG. 24 is a schematic exploded perspective view showing a structure of a liquid crystal display device with a touch panel according to Comparative Example 2. Comparative Example 2 differs from Comparative Example 1 in that the circular polarizers are of the single phase retarder design.

According to Comparative Example 2, polarizer 212 and reverse dispersion quarter-wave plate 213 (Nz=1) make up a wide-band circular polarizer. Outside light passes through the wide-band circular polarizer and is thereby converted into circularly polarized light, which is converted back into linearly polarized light by reverse dispersion quarter-wave plate 212 (Nz=1).

Figure 25:
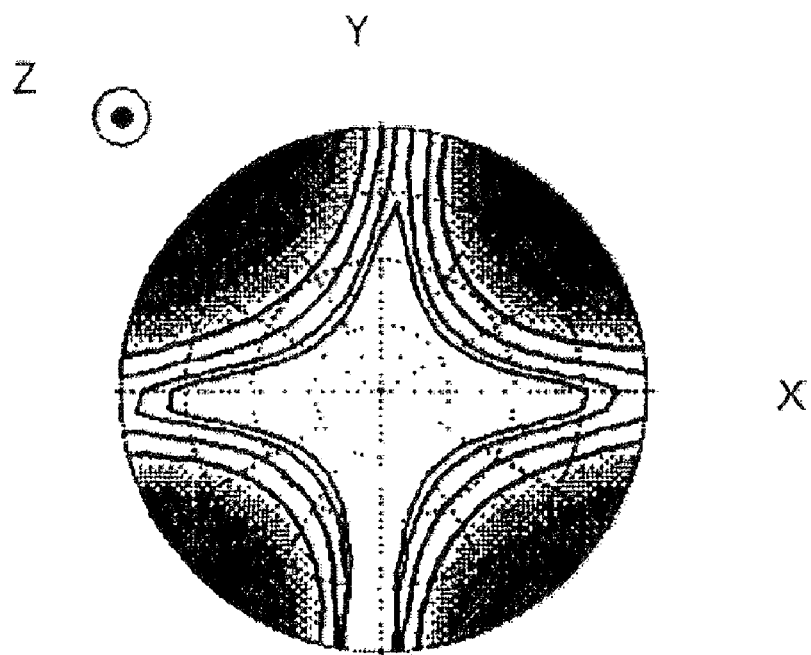
FIG. 25 is an equal-contrast diagram showing field-of-view angle characteristics of a transmissive display region of the liquid crystal display device with the touch panel according to Comparative Example 2.
Figure 26:
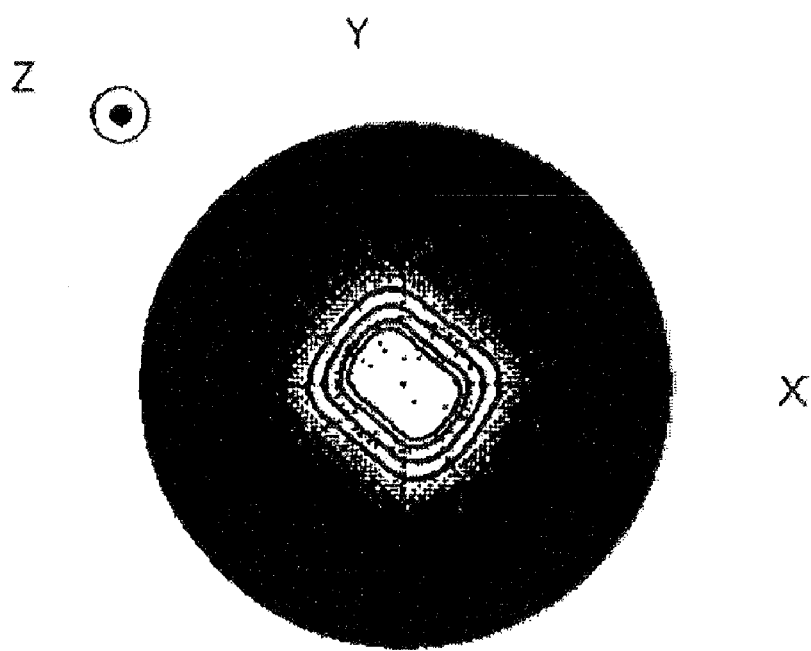
FIG. 26 is an equal-contrast diagram showing field-of-view angle characteristics of a reflective display region of the liquid crystal display device with the touch panel according to Comparative Example 2.

FIGS. 25 and 26 are equal-contrast diagrams showing field-of-view angle characteristics of transmissive and reflective display regions of the liquid crystal display device with the touch panel according to Comparative Example 2. The field-of-view angle characteristics were evaluated in the same manner as Example 2-1. The contrast values represented by the equal contrast lines are defined in the same manner as described above with reference to FIGS. 10 and 11.

A comparison between the equal contrast diagram (FIG. 22) for the transmission display region of Example 4 and the equal contrast diagram (FIG. 25) for the transmission display region of Comparative Example 2 indicates that the field-of-view angle characteristics with respect to the transmission display region of these Examples are essentially equal to each other. A comparison between the equal contrast diagrams (FIGS. 23 and 26) for the reflective display regions indicates that Example 4 has better field-of-view angle characteristics.

According to Example 4, the liquid crystal display device comprises three polarizers and five phase retarders of three types. According to Comparative Example 2, the liquid crystal display device comprises three polarizers and five phase retarders of four types. Therefore, the liquid crystal display device according to Example 4 is one type of phase retarder less than the liquid crystal display device according to Comparative Example 2, and hence is lower in cost.

Exemplary Embodiment 5

Figure 27:
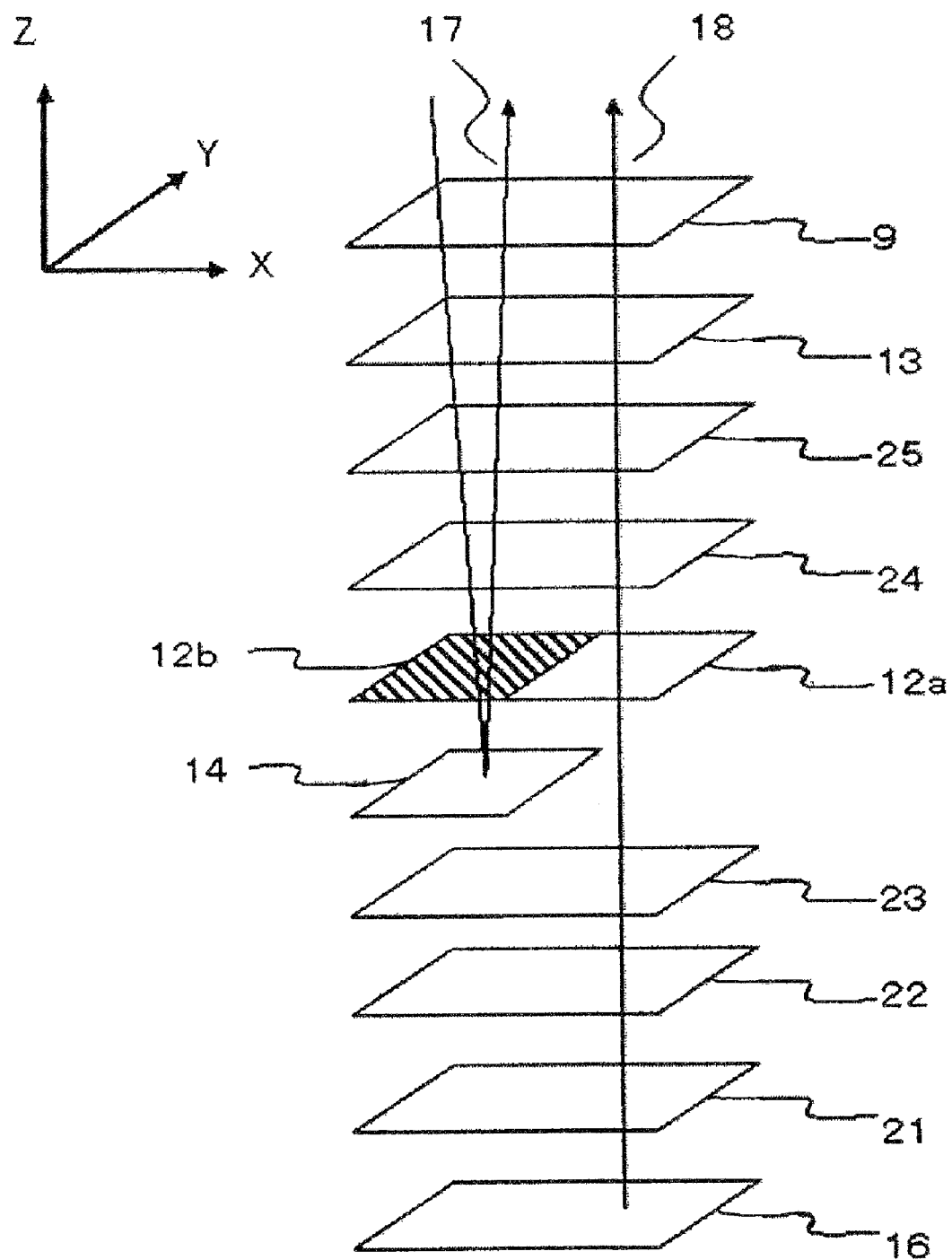
FIG. 27 is a schematic exploded perspective view showing a structure of a liquid crystal display device with a touch panel according to Exemplary Embodiment 5.

A liquid crystal display device with a touch panel according to Exemplary Embodiment 5 will be described below with reference to FIG. 27. The liquid crystal display device with the touch panel according to Exemplary Embodiment 5 is devoid of intermediate polarizer 26 shown in FIG. 20. According to Exemplary Embodiment 5, the refractive anisotropy of fourth phase retarder 25 is canceled by the phase retarder of observer-side circular polarizer 9. Since the liquid crystal display device according to Exemplary Embodiment 5 is one polarizer less than the liquid crystal display device according to Exemplary Embodiment 4, it is lower in cost and thickness.

If intermediate polarizer 26 is employed, then the change of the polarized state is interrupted between back-side polarizer 21 and intermediate polarizer 26 in the transmissive display region, and the change of the polarized state is interrupted between intermediate polarizer 26 and reflector 14 in the reflective display region. If intermediate polarizer 26 is not employed, then all polarized state changes between back-side polarizer 21 and observer-side circular polarizer 9 affect the display in the transmissive display region, and all polarized state changes between observer-side circular polarizer 9 and reflector 14 affect the display in the reflective display region. Therefore, the field-of-view angle characteristics of the contrast ratio are improved by canceling the refractive index anisotropy of fourth phase retarder 25 and making it isotropic.

Example 5

Figure 28:
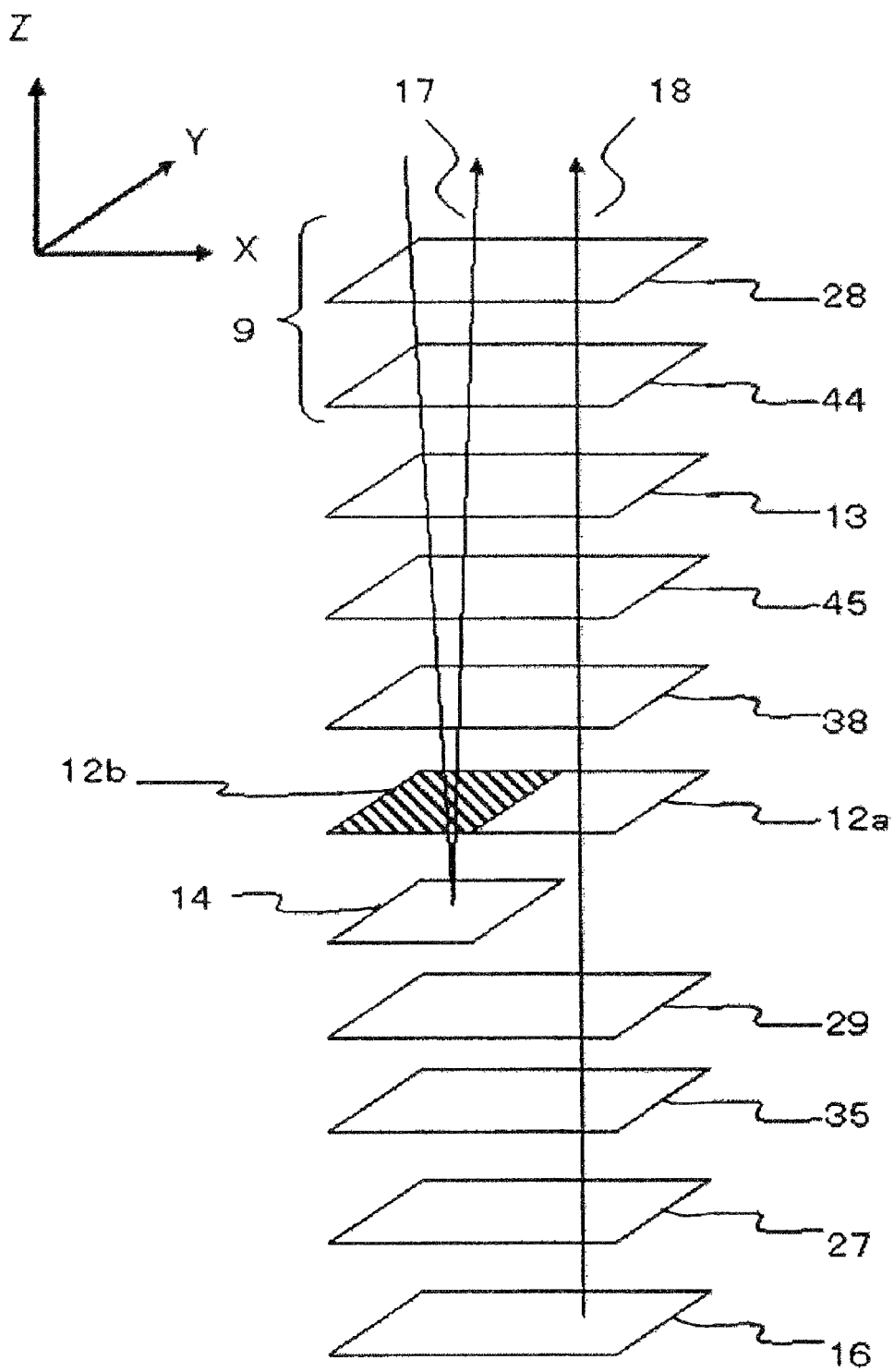
FIG. 28 is a schematic exploded perspective view showing a structure of a liquid crystal display device with a touch panel according to Example 5.

A liquid crystal display device with a touch panel according to Example 5 will be described below. FIG. 28 is a schematic exploded perspective view showing a structure of a liquid crystal display device with a touch panel according to Example 5. According to Example 5, the circular polarizers are of the single phase retarder design.

If the transmissive display region of the liquid crystal display device with the touch panel according to Example 5 is viewed from the display screen, then it comprises polarizer 28 (placement angle: 90 degrees), reverse dispersion quarter-wave plate 44 (Nz=1, placement angle: 135 degrees), touch panel 13, reverse dispersion quarter-wave plate 45 (Nz=0, placement angle: 45 degrees), half-wave plate 38 (Nz=0.5, placement angle: 100 degrees), liquid crystal layer 12a (retardation value: 275 nm, placement angle: 155 degrees), half-wave plate 29 (Nz=0, placement angle: 65 degrees), half-wave plate 35 (Nz=0.5, placement angle: 10 degrees), and polarizer 27 (placement angle: 0 degree) which are stacked together in the order named.

If the reflective display region is viewed from the display screen, then it comprises polarizer 28 (placement angle: 90 degrees), reverse dispersion quarter-wave plate 44 (Nz=1, placement angle: 135 degrees), touch panel 13, reverse dispersion quarter-wave plate 45 (Nz=0, placement angle: 45 degrees), half-wave plate 38 (Nz=0.5, placement angle: 100 degrees), liquid crystal layer 12b (retardation value: 137.5 nm, placement angle: 0 degree), and reflector 14 which are stacked together in the order named.

A black display mode of the transmissive display region will be described below. It is assumed that light transmitted through touch panel 13 has its polarized state unchanged. As with Example 4, half-wave plate 38, liquid crystal layer 12a, half-wave plate 29, and half-wave plate 35 are isotropic with respect to light applied along the direction of the normal line and nearly isotropic with respect to light inclined to the direction of the normal line. Therefore, the transmissive display region can be regarded as the stacked assembly of polarizer 27, reverse dispersion quarter-wave plate 45, touch panel 13, reverse dispersion quarter-wave plate 44, and polarizer 28. The stacked assembly of reverse dispersion quarter-wave plate 45 and reverse dispersion quarter-wave plate 44 is also isotropic with respect to light applied along the direction of the normal line and nearly isotropic with respect to light inclined to the direction of the normal line. Therefore, the black display mode of the transmissive display region has good field-of-view angle characteristics.

Figure 29:
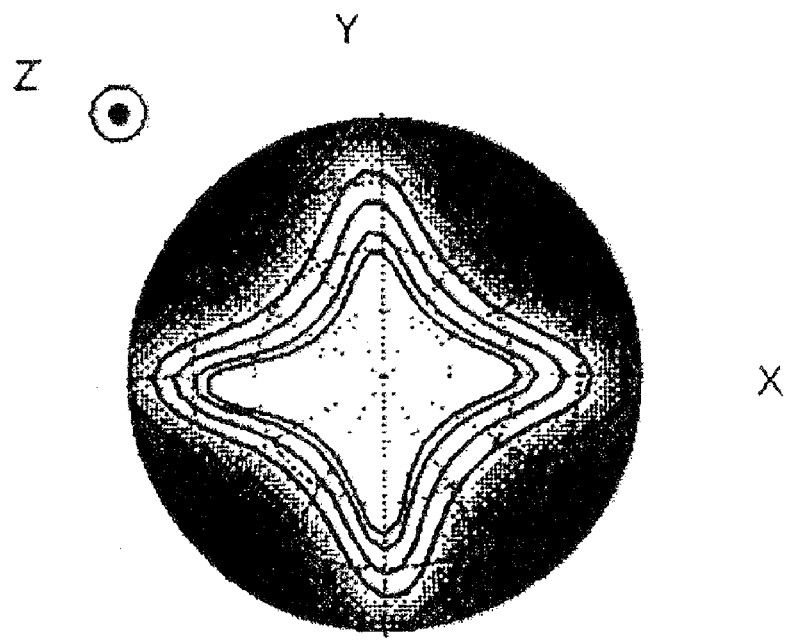
FIG. 29 is an equal-contrast diagram showing field-of-view angle characteristics of a transmissive display region of the liquid crystal display device with the touch panel according to Example 5.

FIG. 29 is an equal-contrast diagram showing field-of-view angle characteristics of the transmissive display region of the liquid crystal display device with the touch panel according to Example 5. The field-of-view angle characteristics were evaluated in the same manner as Example 2-1. The contrast values represented by the equal contrast lines are defined in the same manner as described above with reference to FIG. 10.

A black display mode of the reflective display region will be described below. The stacked assembly of reverse dispersion quarter-wave plate 45 and reverse dispersion quarter-wave plate 44 is isotropic with respect to light applied along the direction of the normal line and nearly isotropic with respect to light inclined to the direction of the normal line. Therefore, the reflective display region can be retarded as the stacked assembly of polarizer 28, half-wave plate 38, and liquid crystal layer 12b. The polarizer 28, half-wave plate 38, and liquid crystal layer 12b make up a wide-band circular polarizer. The light that has passed through polarizer 28, half-wave plate 38, and liquid crystal layer 12b is converted into circularly polarized light, which is converted into reversely circularly polarized light when it is reflected by reflector 14. Since the reversely circularly polarized light cannot pass through the wide-band circular polarizer made up of liquid crystal layer 12b, half-wave plate 38, and polarizer 28, the reflective display region displays black.

Figure 30:
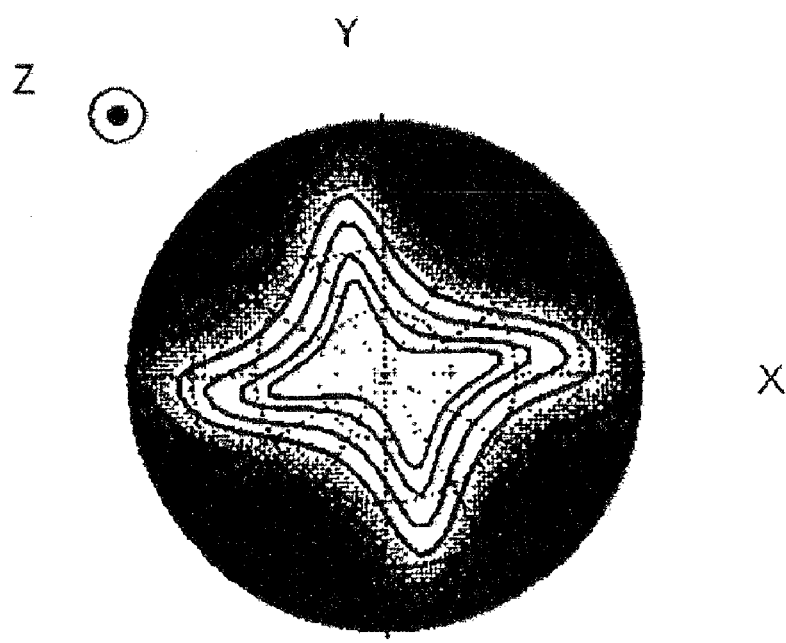
FIG. 30 is an equal-contrast diagram showing field-of-view angle characteristics of a reflective display region of the liquid crystal display device with the touch panel according to Example 5.

FIG. 30 is an equal-contrast diagram showing field-of-view angle characteristics of the reflective display region of the liquid crystal display device with the touch panel according to Example 5. The field-of-view angle characteristics were evaluated in the same manner as Example 2-1. The contrast values represented by the equal contrast lines are defined in the same manner as described above with reference to FIG. 11.

Exemplary Embodiment 6

The transparent substrate of the touch panel of the liquid crystal display device according to the present invention may double as a phase retarder or a polarizer for a further reduction in the cost, thickness, and weight.

Figure 31:
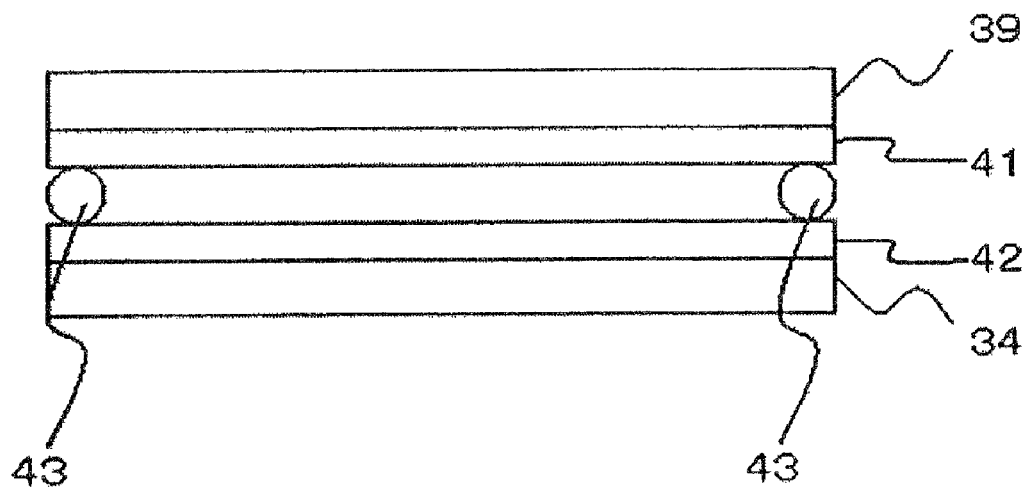
FIG. 31 is a schematic cross-sectional view showing a structure of a liquid crystal display device with a touch panel according to Exemplary Embodiment 6.

For example, as shown in FIG. 31, the transparent substrate of a touch panel may double as quarter-wave plate 39 (Nz=0.5) and quarter-wave plate 34 (Nz=0) shown in FIG. 9. Specifically, quarter-wave plate 39 with transparent electrode 41 grown as a film thereon and quarter-wave plate 34 with trans-parent electrode 42 grown as a film thereon are bonded to each other with spacers 43 interposed therebetween, providing a resistance-film touch panel. The resistance-film touch panel has the same optical characteristics as those according to Example 2-1.

Exemplary Embodiment 7

Figure 32:
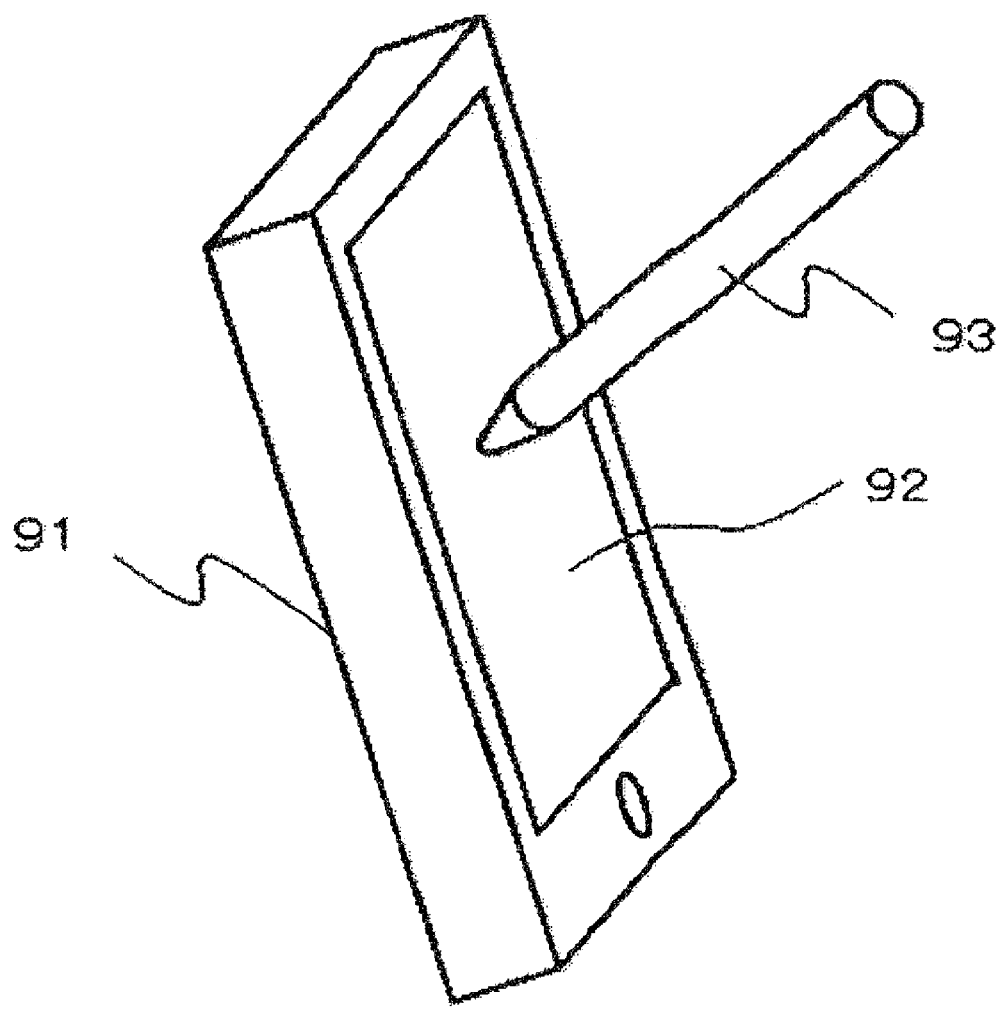
FIG. 32 is a perspective view of a terminal device according to Exemplary Embodiment 7.

FIG. 32 is a perspective view of a portable terminal device incorporating a liquid crystal display device with a touch panel according to Exemplary Embodiment 7. As shown in FIG. 32, liquid crystal display device 92 with a touch panel is mounted on PDA 91, for example. When the touch panel is pressed by stylus pen 94, a finger, or the like, the touch panel can sense the position where it is pressed.

The liquid crystal display device with the touch panel according to the present invention is applicable to not only PDAs, but also various portable terminal devices including cellular phones, game machines, digital cameras, and digital video cameras, etc. In addition, the liquid crystal display device is applicable to not only portable terminal devices, but also various terminal devices including notebook personal computers, cash dispensers, and automatic vending machines, etc.

While preferred embodiments of the present invention have been described using specific terms, such description is for illustrative purposes only, and it is to be understood that changes and variations may be made without departing from the spirit or scope of the following claims.

What is claimed is:

1. A liquid crystal display device with a touch panel, which has a reflective display region for being irradiated with outside light and a transmissive display region for being irradiated with light emitted from a light source, at least said transmissive display region including a liquid crystal layer energizable according to a lateral electric field mode, comprising:

a back-side substrate and an observer-side substrate which are disposed in confronting relation to each other;

a liquid crystal layer held between said back-side substrate and said observer-side substrate;

an observer-side circular polarizer disposed outwardly of said observer-side substrate;

a back-side circular polarizer disposed outwardly of said back-side substrate;

an observer-side compensator disposed between said observer-side circular polarizer and said observer-side substrate, the observer-side compensator reducing refractive index anisotropy of said liquid crystal layer in said reflective display region and said liquid crystal layer in said transmissive display region; and a touch panel disposed between said observer-side circular polarizer and said observer-side compensator.

2. A liquid crystal display device with a touch panel according to claim 1, further comprising: a back-side compensator disposed between said back-side circular polarizer and said back-side substrate, for reducing the refractive index anisotropy of said liquid crystal layer in said transmissive display region.

3. A liquid crystal display device with a touch panel according to claim 2, wherein the refractive index anisotropy of said liquid crystal layer in said trans-missive display region is canceled by said observer-side compensator and said back-side compensator.

4. A liquid crystal display device with a touch panel according to claim 1, wherein the refractive index anisotropy of said liquid crystal layer in said trans-missive display region is canceled by said observer-side compensator.

5. A liquid crystal display device with a touch panel according to claim 1, wherein said back-side circular polarizer includes a phase retarder for canceling refractive index anisotropy of a phase retarder of said observer-side circular polarizer.

6. A liquid crystal display device with a touch panel according to claim 1, further comprising: a touch panel compensator disposed between said touch panel and said observer-side compensator for reducing a retardation caused by said touch panel.

7. A liquid crystal display device with a touch panel according to claim 5, wherein all phase retarders of said back-side circular polarizer and all phase retarders of said observer-side circular polarizer have an Nz coefficient of 0.5.

8. A liquid crystal display device with a touch panel, which has a reflective display region for being irradiated with outside light and a transmissive display region for being irradiated with light emitted from a light source, at least said transmissive display region including a liquid crystal layer energizable according to a lateral electric field mode, comprising:
a first substrate and a second substrate which are disposed in confronting relation to each other;
a liquid crystal layer held between said first substrate and said second substrate;
a stacked assembly of a first phase retarder having an Nz coefficient of about 0.5, an intermediate polarizer, a fourth phase retarder, a touch panel and an observer-side circular polarizer which are successively arranged from said first substrate, said stacked assembly being disposed on a side of said first substrate remote from said liquid crystal layer; and
a stacked assembly of a second phase retarder having an Nz coefficient of about 0, a third phase retarder having an Nz coefficient of about 0.5 and a back-side polarizer which are successively arranged from said second substrate, said stacked assembly being disposed on a side of said second substrate remote from said liquid crystal layer;
said first phase retarder and said third phase retarder having respective retarder axes substantially perpendicular to each other;
said first phase retarder and said third phase retarder having respective retardations substantially equal to each other;
said second phase retarder having a retarder axis substantially perpendicular to an orientation axis of said liquid crystal layer in said transmissive display region;
said second phase retarder and said liquid crystal layer in said transmissive display region having respective retardations substantially equal to each other;
wherein said fourth phase retarder converts circularly polarized light applied thereto into linearly polarized light.

9. A liquid crystal display device with a touch panel, which has a reflective display region for being irradiated with outside light and a transmissive display region for being irradiated with light emitted from a light source, at least said transmissive display region including a liquid crystal layer energizable according to a lateral electric field mode, comprising:
a first substrate and a second substrate which are disposed in confronting relation to each other;
a liquid crystal layer held between said first substrate and said second substrate;
a stacked assembly of a first phase retarder having an Nz coefficient of about 0.5, a fourth phase retarder, a touch panel and an observer-side circular polarizer which are successively arranged from said first substrate, said stacked assembly being disposed on a side of said first substrate remote from said liquid crystal layer; and
a stacked assembly of a second phase retarder having an Nz coefficient of about 0, a third phase retarder having an Nz coefficient of about 0.5 and a back-side polarizer which are successively arranged from said second substrate, said stacked assembly being disposed on a side of said second substrate remote from said liquid crystal layer;
said first phase retarder and said third phase retarder having respective retarder axes substantially perpendicular to each other;
said first phase retarder and said third phase retarder having respective retardations substantially equal to each other;
said second phase retarder having a retarder axis substantially perpendicular to an orientation axis of said liquid crystal layer in said transmissive display region;
said second phase retarder and said liquid crystal layer in said transmissive display region having respective retardations substantially equal to each other;
wherein said fourth phase retarder converts circularly polarized light applied thereto into linearly polarized light; and
said observer-side circular polarizer including a phase retarder for canceling refractive index anisotropy of said fourth phase retarder.

10. A liquid crystal display device with a touch panel according to claim 8, further comprising: a touch panel compensator disposed between said touch panel and said fourth phase retarder for reducing a retardation caused by said touch panel.

11. A liquid crystal display device with a touch panel according to claim 9, further comprising: a touch panel compensator disposed between said touch panel and said fourth phase retarder for reducing a retardation caused by said touch panel.

12. A liquid crystal display device with a touch panel according to claim 1, wherein said touch panel includes a transparent substrate doubling as at least a phase retarder of said observer-side circular polarizer.

13. A terminal device incorporating a liquid crystal display device with a touch panel according to claim 1.

14. A terminal device incorporating a liquid crystal display device with a touch panel according to claim 8.

15. A terminal device incorporating a liquid crystal display device with a touch panel according to claim 9.

* * * * *